United States Patent
Zafer et al.

(10) Patent No.: US 11,431,550 B2
(45) Date of Patent: Aug. 30, 2022

(54) SYSTEM AND METHOD FOR NETWORK INCIDENT REMEDIATION RECOMMENDATIONS

(71) Applicant: VMware, Inc., Palo Alto, CA (US)

(72) Inventors: Murtaza Zafer, San Jose, CA (US); Anand Srinivas, San Francisco, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/882,364

(22) Filed: May 22, 2020

(65) Prior Publication Data
US 2020/0287779 A1     Sep. 10, 2020

Related U.S. Application Data

(63) Continuation of application No. 15/809,889, filed on Nov. 10, 2017, now Pat. No. 10,666,494.

(51) Int. Cl.
*H04L 41/0631* (2022.01)
*H04L 41/0654* (2022.01)
(Continued)

(52) U.S. Cl.
CPC ...... *H04L 41/0631* (2013.01); *H04L 41/0609* (2013.01); *H04L 41/069* (2013.01); *H04L 41/0654* (2013.01); *H04L 41/0677* (2013.01)

(58) Field of Classification Search
CPC ............. H04L 41/0631; H04L 41/0654; H04L 41/0609; H04L 41/0677
See application file for complete search history.

(56) References Cited

U.S. PATENT DOCUMENTS

| 5,929,855 A | 7/1999 | Benton et al. |
| 7,424,608 B1 | 9/2008 | Cherukumudi et al. |

(Continued)

FOREIGN PATENT DOCUMENTS

| EP | 2518940 A1 | 10/2012 |
| EP | 2582100 A1 | 4/2013 |

(Continued)

OTHER PUBLICATIONS

Das, Anupam, et al., "Transparent and Flexible Network Management for Big Data Processing in the Cloud," 5th USENIX Workshop on Hot Topics in Cloud Computing, Jun. 25-26, 2013, 6 pages, USENIX, San Jose, CA.

(Continued)

*Primary Examiner* — El Hadji M Sall
(74) *Attorney, Agent, or Firm* — Adeli LLP

(57) ABSTRACT

A method for analyzing network incidents within a network and providing prioritized remediation recommendations is disclosed. The method includes: receiving network data and computing a plurality of network incidents from the network data, collecting network incidents related to a particular network issue over a time period and grouping the network incidents according to root-cause symptoms, generating a network incident graph by superimposing groups of network incidents over a network graph, analyzing the network incident graph to identify localized areas with systemic issues; and based on the analysis of the network incident graph, generating and displaying a list of remediation recommendations. Each remediation recommendation includes a systemic issue in the network, a remediation to resolve the issue, and a quantified expected benefit from implementing the remediation.

20 Claims, 22 Drawing Sheets

(51) Int. Cl.
*H04L 41/0604* (2022.01)
*H04L 41/069* (2022.01)
*H04L 41/0677* (2022.01)

(56) References Cited

U.S. PATENT DOCUMENTS

| | | | |
|---|---|---|---|
| 7,636,424 | B1 | 12/2009 | Halikhedkar et al. |
| 8,015,604 | B1 | 9/2011 | Tidwell et al. |
| 8,504,679 | B2* | 8/2013 | Spire .................. G06F 11/0748 709/224 |
| 9,026,507 | B2 | 5/2015 | Shraim et al. |
| 9,143,452 | B2 | 9/2015 | Lumezanu et al. |
| 9,215,142 | B1 | 12/2015 | Herold et al. |
| 9,544,205 | B2 | 1/2017 | Chandrayana et al. |
| 9,619,654 | B2 | 4/2017 | Dolan-Gavitt et al. |
| 9,639,693 | B2 | 5/2017 | Rivera et al. |
| 9,985,982 | B1* | 5/2018 | Bartos .................. G06F 21/566 |
| 10,193,741 | B2 | 1/2019 | Zafer et al. |
| 10,200,267 | B2 | 2/2019 | Zafer et al. |
| 10,230,609 | B2 | 3/2019 | Chandrasekaran et al. |
| 10,601,654 | B2 | 3/2020 | Srinivas et al. |
| 10,601,691 | B2 | 3/2020 | Chandrasekaran et al. |
| 10,630,547 | B2 | 4/2020 | Srinivas et al. |
| 10,666,494 | B2 | 5/2020 | Zafer et al. |
| 10,740,765 | B1* | 8/2020 | Chheda .................. G06Q 30/00 |
| 11,102,102 | B2 | 8/2021 | Chandrasekaran et al. |
| 2002/0091819 | A1 | 7/2002 | Melchione et al. |
| 2002/0143914 | A1 | 10/2002 | Cihula |
| 2003/0033402 | A1 | 2/2003 | Battat et al. |
| 2003/0200277 | A1 | 10/2003 | Kim |
| 2004/0250124 | A1 | 12/2004 | Chesla et al. |
| 2005/0010821 | A1* | 1/2005 | Cooper ............... H04L 63/1433 726/4 |
| 2006/0109793 | A1 | 5/2006 | Kim et al. |
| 2006/0156032 | A1 | 7/2006 | Panjwani |
| 2006/0233115 | A1 | 10/2006 | Matityahu et al. |
| 2006/0253566 | A1 | 11/2006 | Stassinopoulos et al. |
| 2007/0115916 | A1 | 5/2007 | Nguyen et al. |
| 2007/0223432 | A1 | 9/2007 | Badarinath |
| 2007/0232202 | A1 | 10/2007 | Schneeberger |
| 2008/0016412 | A1 | 1/2008 | White et al. |
| 2008/0209015 | A1 | 8/2008 | Le et al. |
| 2009/0013216 | A1 | 1/2009 | Abrashkevich et al. |
| 2009/0257353 | A1 | 10/2009 | Song et al. |
| 2009/0265778 | A1 | 10/2009 | Wahl et al. |
| 2010/0218031 | A1 | 8/2010 | Agarwal et al. |
| 2010/0274596 | A1 | 10/2010 | Grace et al. |
| 2010/0299292 | A1 | 11/2010 | Collazo |
| 2010/0332680 | A1 | 12/2010 | Anderson et al. |
| 2010/0333177 | A1 | 12/2010 | Donley et al. |
| 2011/0008172 | A1 | 1/2011 | Jette et al. |
| 2011/0047286 | A1 | 2/2011 | Harrang et al. |
| 2011/0296015 | A1 | 12/2011 | Chakravarty et al. |
| 2012/0022916 | A1 | 1/2012 | Todd et al. |
| 2012/0198541 | A1 | 8/2012 | Reeves |
| 2012/0311715 | A1 | 12/2012 | Tal et al. |
| 2013/0054773 | A1 | 2/2013 | Onoue |
| 2013/0060603 | A1 | 3/2013 | Wagner |
| 2013/0094376 | A1 | 4/2013 | Reeves |
| 2013/0117847 | A1 | 5/2013 | Friedman et al. |
| 2013/0159395 | A1 | 6/2013 | Backholm et al. |
| 2013/0176858 | A1 | 7/2013 | Zee et al. |
| 2013/0185438 | A1 | 7/2013 | Lumezanu et al. |
| 2013/0250770 | A1 | 9/2013 | Zou et al. |
| 2013/0290512 | A1 | 10/2013 | Ngoo et al. |
| 2013/0290520 | A1 | 10/2013 | Noo et al. |
| 2013/0298170 | A1 | 11/2013 | ElArabawy et al. |
| 2013/0305090 | A1 | 11/2013 | Kristiansen et al. |
| 2013/0343390 | A1 | 12/2013 | Moriarty et al. |
| 2014/0064066 | A1 | 3/2014 | Lumezanu et al. |
| 2014/0068053 | A1 | 3/2014 | Ravi et al. |
| 2014/0086069 | A1 | 3/2014 | Frey et al. |
| 2014/0133497 | A1 | 5/2014 | Chapman |
| 2014/0156824 | A1 | 6/2014 | Biswas et al. |
| 2014/0201642 | A1 | 7/2014 | Vicat-Blanc |
| 2014/0215058 | A1 | 7/2014 | Vicat-Blanc et al. |
| 2014/0215077 | A1 | 7/2014 | Soudan et al. |
| 2014/0254380 | A1 | 9/2014 | Swenson et al. |
| 2014/0280802 | A1 | 9/2014 | McDowall |
| 2014/0280887 | A1 | 9/2014 | Kjendal et al. |
| 2014/0280889 | A1 | 9/2014 | Nispel et al. |
| 2014/0282823 | A1 | 9/2014 | Rash et al. |
| 2014/0304207 | A1 | 10/2014 | Chandrayana et al. |
| 2015/0055478 | A1 | 2/2015 | Tabatabaee et al. |
| 2015/0085694 | A1 | 3/2015 | Agarwal et al. |
| 2015/0103667 | A1 | 4/2015 | Elias et al. |
| 2015/0113132 | A1 | 4/2015 | Srinivas et al. |
| 2015/0113133 | A1 | 4/2015 | Srinivas et al. |
| 2015/0117420 | A1 | 4/2015 | Raman et al. |
| 2015/0142935 | A1 | 5/2015 | Srinivas et al. |
| 2015/0142936 | A1 | 5/2015 | Srinivas et al. |
| 2015/0142962 | A1 | 5/2015 | Srinivas et al. |
| 2015/0215334 | A1 | 7/2015 | Bingham et al. |
| 2015/0229661 | A1 | 8/2015 | Balabine et al. |
| 2015/0249587 | A1 | 9/2015 | Kozat et al. |
| 2015/0288557 | A1 | 10/2015 | Gates et al. |
| 2015/0295808 | A1 | 10/2015 | O'Malley et al. |
| 2015/0341285 | A1 | 11/2015 | Aysola et al. |
| 2016/0104114 | A1 | 4/2016 | Speich et al. |
| 2016/0134469 | A1 | 5/2016 | Carter et al. |
| 2017/0099195 | A1 | 4/2017 | Raney |
| 2017/0288987 | A1 | 10/2017 | Pasupathy et al. |
| 2017/0302505 | A1 | 10/2017 | Zafer et al. |
| 2017/0302553 | A1 | 10/2017 | Zafer et al. |
| 2017/0302554 | A1 | 10/2017 | Chandrasekaran et al. |
| 2017/0310546 | A1 | 10/2017 | Nair et al. |
| 2018/0062941 | A1 | 3/2018 | Brown et al. |
| 2019/0132230 | A1 | 5/2019 | Chandrasekaran et al. |
| 2019/0149396 | A1 | 5/2019 | Zafer et al. |
| 2020/0044921 | A1 | 2/2020 | Srinivas et al. |
| 2020/0280490 | A1 | 9/2020 | Srinivas et al. |
| 2020/0287790 | A1 | 9/2020 | Srinivas et al. |
| 2020/0287791 | A1 | 9/2020 | Srinivas et al. |
| 2020/0287816 | A1 | 9/2020 | Chandrasekaran et al. |
| 2021/0385143 | A1 | 12/2021 | Chandrasekaran et al. |

FOREIGN PATENT DOCUMENTS

| | | |
|---|---|---|
| WO | 2003096729 A1 | 11/2003 |
| WO | 2005109754 A1 | 11/2005 |
| WO | 2009032925 A1 | 3/2009 |
| WO | 2015061353 A1 | 4/2015 |
| WO | 2017184627 A2 | 10/2017 |
| WO | 2019094630 A1 | 5/2019 |

OTHER PUBLICATIONS

Non-Published Commonly Owned U.S. Appl. No. 16/821,957, filed Mar. 17, 2020, 91 pages, VMware, Inc.
Non-Published Commonly Owned U.S. Appl. No. 16/827,571, filed Mar. 23, 2020, 62 pages, VMware, Inc.
Non-Published Commonly Owned U.S. Appl. No. 16/880,948, filed May 21, 2020, 59 pages, VMware, Inc.
Non-Published Commonly Owned U.S. Appl. No. 16/880,978, filed May 21, 2020, 61 pages, VMware, Inc.
PCT International Search Report and Written Opinion of Commonly Owned International Patent Application PCT/US2018/059876, dated Jan. 24, 2019, 11 pages, International Searching Authority (US).
Wang, Ting, et al., "Spatio-temporal Patterns in Network Events," Proceedings of the 2010 ACM Conference on Emerging Networking Experiments and Technology, Nov. 30-Dec. 1, 2010, 12 pages, ACM, Philadelphia, PA, USA.
Non-Published Commonly Owned U.S Appl. No. 17/409,778, filed Aug. 23, 2021, 95 pages, VMware, Inc.

* cited by examiner

| | |
|---|---|
| Wi-Fi | Alleviate Poor Coverage on 2.4Ghz |
| | Alleviate Poor Coverage on 5Ghz |
| | Alleviate Interference from Rogue APs on 2.4Ghz |
| | Alleviate Interference from Rogue APs on 5Ghz |
| | Alleviate Sticky Clients on 2.4Ghz |
| | Alleviate Sticky Clients on 5Ghz |
| | Alleviate High Levels of Non Wi-Fi Noise on 2.4Ghz |
| | Alleviate High Levels of Non Wi-Fi Noise on 5Ghz |
| | Alleviate High Number of Co-Channel APs on 2.4Ghz |
| | Alleviate High Number of Co-Channel APs on 5Ghz |
| | Alleviate High Channel Utilization on 2.4Ghz |
| | Alleviate High Channel Utilization on 5Ghz |
| | Alleviate High Number of Clients Using the Same AP on 2.4Ghz |
| | Alleviate High Number of Clients Using the Same AP on 5Ghz |
| | Alleviate High Co-Channel Interference on 2.4Ghz |
| | Alleviate High Co-Channel Interference on 5Ghz |
| | Enable DFS Channels |
| | Enable Bandsteering |
| DHCP | DHCP Server Not Reachable/ Server Ip Pool Misconfig DHCP Scope Exhaustion |
| | Excessive Conflict Checks/ Server Overloaded |
| | Clients DHCP Requests Getting Rejected by DHCP Server |
| | Clients DHCP Transactions Undergoing High Latency/ Drops |
| | DHCP Server is Not Allocating IP for Clients on VLAN with DHCP Relay |
| | DHCP Discovers and Requests from DHCP Relay Not Getting Responded to |
| | No Response from DHCP Server on VLAN |

FIG. 19

SYSTEM AND METHOD FOR NETWORK INCIDENT REMEDIATION RECOMMENDATIONS

CLAIM OF BENEFIT TO PRIOR APPLICATION

This application is a continuation application of U.S. patent application Ser. No. 15/809,889, filed Nov. 10, 2017, now published as U.S. Patent Publication 2019/0149396. U.S. patent application Ser. No. 15/809,889, now published as U.S. Patent Publication 2019/0149396 is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure pertains generally to the fields of identifying and analyzing network incidents. More particularly, the present disclosure relates to a system and method that analyzes network data and recommends remediation actions to mitigate network incidents.

DESCRIPTION OF THE RELATED ART

Obtaining business-level insight and control over the applications, users and devices in modern networks is becoming extremely challenging. On the applications front, modern networks have a huge mix in application types and deployment locations. For example, business applications may be hosted off-premise in the cloud (e.g., salesforce.com), on-premise in a local data center (e.g., SAP), or on-premise between hosts (e.g., unified communications). On the users and devices front, modern networks are accessed by a myriad of devices from wired desktops to wireless devices such as laptop computers, mobile phones, and tablet PCs.

Traditional performance monitoring or analytics tools work in silos on individual layers of the network stack and do not analyze correlated information across the multiple layers of the network stack to provide a comprehensive view of the network performance from an end-user perspective. Moreover, they do not perform analysis across multiple disparate networks to yield better insights for any given network environment. Finally, traditional performance monitoring and analytics tools are limited and are not proactive. In this regard, traditional performance monitoring and analytics tools provide raw data for users to explore, but do not provide recommendations on actions to take, provide predictions of future user performance, or the like.

BRIEF SUMMARY

A method for analyzing network incidents within a network and providing prioritized remediation recommendations may be summarized as including: receiving a stream of network data and computing a plurality of network incidents within the network from the network data, wherein a network incident is a client, infrastructure, or application issue that negatively affects a subset of clients in the network, wherein each network incident has a set of symptoms that relate to possible root-causes, and wherein network incidents are measureable in client incident hours, client incident hours being a cumulative duration of a network incident aggregated across all affected clients; collecting all the network incidents related to a particular network issue over a time period and aggregating client incident hours across a collection of network incidents by grouping the network incidents according to root-cause symptoms; and based on the analysis of the network incident graph, generating and displaying a list of remediation recommendations, wherein each remediation recommendation includes a systemic issue in the network, a remediation to resolve the systemic issue, and a quantified expected benefit from implementing the remediation.

The quantified expected benefit from implementing the remediation may be quantified in client incident hours. The list of remediation recommendations may be prioritized on based a total number of client-hours associated with that systemic issue. The list of remediation recommendations may be prioritized based on actionability, wherein actionability is defined as how quickly a particular remediation may be applied.

The method for analyzing network incidents within a network and providing prioritized remediation recommendations may further include: generating a network incident graph by superimposing a client-hours distribution over a network graph, wherein nodes in the network incident graph represent physical network entities or logical network groupings, wherein edges represent a relationship between the nodes, and wherein weights of the nodes represent cumulative client hours associated with that node; and analyzing the network incident graph to identify localized areas with systemic issues.

Analyzing the network incident graph may include identifying connected components of the network incident graph that have a significant amount of client-hours associated therein. Analyzing the network incident graph may include using a highest weighted node algorithm to identify structures in the network incident graph. Analyzing the network incident graph may include using a most connected node algorithm to identify structures in the network incident graph. Analyzing the network incident graph may include using a node cluster with highest density algorithm to identify structures in the network incident graph.

The method for analyzing network incidents within a network and providing prioritized remediation recommendations may further include receiving user input selecting a remediation recommendation from the list of remediation recommendations.

The method for analyzing network incidents within a network and providing prioritized remediation recommendations may further include implementing the user input selected remediation recommendation from the list of remediation recommendations.

A system for analyzing network incidents within a network and providing prioritized remediation recommendations may be summarized as including: a memory device storing instructions thereon that when executed by one or more processors, causes the one or more processors to: receive a stream of network data and compute a plurality of network incidents within the network from the network data, wherein a network incident is a client, infrastructure, or application issue that negatively affects a subset of clients in the network, wherein each network incident has a set of symptoms that relate to possible root-causes, and wherein network incidents are measureable in client incident hours, client incident hours being a cumulative duration of a network incident aggregated across all affected clients; collect all the network incidents related to a particular network issue over a time period and aggregate client incident hours across a collection of network incidents by grouping the network incidents according to root-cause symptoms; and based on the analysis of the network incident graph, generate and display a list of remediation recommendations, wherein each remediation recommendation includes a systemic issue in the network, a remediation to resolve the issue, and a quantified expected benefit from implementing the remediation.

The quantified expected benefit from implementing the remediation may be quantified in client incident hours. The list of remediation recommendations may be prioritized based on a total number of client-hours associated with that issue. The list of remediation recommendations may be prioritized based on actionability, wherein actionability is defined as how quickly a particular remediation may be applied.

The system for analyzing network incidents within a network and providing prioritized remediation recommendations may include a memory device storing further instructions thereon that when executed by one or more processors, causes the one or more processors to: generate a network incident graph by superimposing a client-hours distribution over a network graph, wherein nodes in the network incident graph represent physical network entities or logical network groupings, wherein edges represent a relationship between the nodes, and wherein weights of the nodes represent cumulative client hours associated with that node; and analyze the network incident graph to identify localized areas with systemic issues.

Analyzing the network incident graph may include identifying connected components of the network incident graph that have a significant amount of client-hours associated therein. Analyzing the network incident graph may include using a highest weighted node algorithm to identify structures in the network incident graph. Analyzing the network incident graph may include using a most connected node algorithm to identify structures in the network incident graph. Analyzing the network incident graph may include using a node cluster with highest density algorithm to identify structures in the network incident graph. The memory device storing instructions thereon that when executed by the one or more processors, may cause one or more processors to receive user input selecting a remediation recommendation from the list of remediation recommendations. The memory device storing instructions thereon may, when executed by the one or more processors, one or more processors to implement the user input selected remediation recommendation from the list of remediation recommendations.

A system for analyzing network incidents within a network and providing prioritized remediation recommendations may be summarized as including: a memory device storing instructions thereon that when executed by one or more processors, causes the one or more processors to: receive network data and compute a plurality of network incidents from the network data, wherein a network incident is a client, infrastructure, or application issue that negatively affects a subset of clients in the network; collect all the network incidents related to a particular network issue over a time period and group the network incidents according to root-cause symptoms; generate a network incident graph by superimposing groups of network incidents over a network graph, wherein nodes in the network incident graph represent physical network entities or logical network groupings, wherein edges represent a relationship between the nodes, and wherein weights of the nodes represent a size of the network incident group associated with that node; analyze the network incident graph to identify localized areas with systemic issues; and based on the analysis of the network incident graph, generate and display a list of remediation recommendations, wherein each remediation recommendation includes a systemic issue in the network, a remediation to resolve the issue, and a quantified expected benefit from implementing the remediation.

Further aspects of the disclosed embodiments will be brought out in the following portions of the specification, wherein the detailed description is for the purpose of fully disclosing the various embodiments without placing limitations thereon.

BRIEF DESCRIPTION OF THE SEVERAL VIEWS OF THE DRAWING

The present application will be more fully understood by reference to the following figures, which are for illustrative purposes only. The figures are not necessarily drawn to scale, and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Figure 1A:
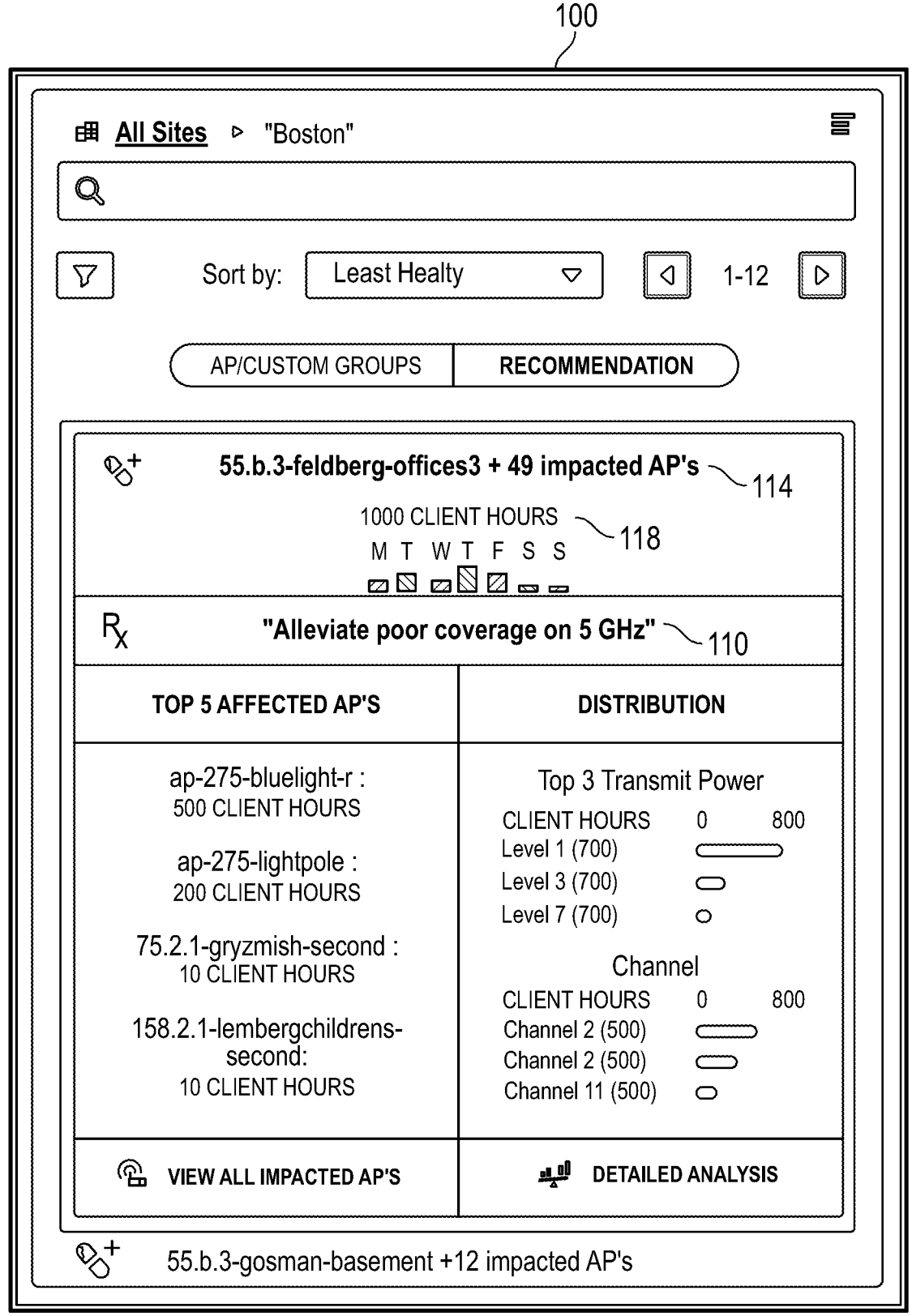
FIG. 1A illustrates an exemplary remediation recommendation interface in a system and method for network incident remediation recommendations.

Persons of ordinary skill in the art will understand that the present disclosure is illustrative only and not in any way limiting. Other embodiments of the presently disclosed system and method readily suggest themselves to such skilled persons having the assistance of this disclosure.

Each of the features and teachings disclosed herein can be utilized separately or in conjunction with other features and teachings to provide a system and method for network incident identification and analysis. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities, and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present application also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The disclosed system and method is directed towards the identification and analysis of network incidents. One such embodiment of a disclosed method includes: executing performance calculations on the real-time network data, detecting network incidents from the executed performance calculations on the real-time network data, performing pattern detection of the detected network incidents, identifying one or more root causes of a detected network incident pattern, and determining remediation of the identified one or more root causes of the detected network incident pattern.

Within the context of the description of network incidents in the present application, the phrase "network incident" is defined as the presence of a "pattern" over the computed values of one or more performance metrics for a certain time window. A pattern is defined as one of the following, (a) the proportion of metric values that cross a threshold exceeding a defined percentage amount, (b) the presence of a certain sequence of metric values, (c) time-ordered stretch of certain metric values with the length of the stretch exceeding a defined threshold, and (d) presence of a cyclical sequence of metric values. Network incidents are further classified herein either as a Client network incident or as an Infrastructure network incident. A client network incident is a network incident where the computed metrics relate to the calculations on data that relates to a user/client in the network. An infrastructure network incident is a network incident where the computed metrics relate to the calculations on data that relates to an infrastructure element in the network.

Within the context of the present application, the term "real-time" is defined as collecting network data related to a wired or wireless network flow/transaction and performing calculations on the network data within a short duration (e.g., seconds or minutes) of the occurrence of the network flow/transaction.

Referring now to FIG. 1A, in at least one embodiment, a system and method for network incident remediation recommendation receives network data, analyzes network incidents and their root cause symptoms identified from the network data, and presents a list of remediation recommendations that may be taken to resolve current issues, mitigate future network incidents, or both.

Specifically, FIG. 1A displays a remediation recommendation interface 100 of the system and method for network incident remediation recommendation. The remediation recommendation interface 100 includes an action component 110, a target component 114, and a quantified expected benefit component 118. Specifically, in this embodiment the Remediation Recommendation Interface 100 displays a remediation recommendation that includes three components: (1) an action component 110 to mitigate a particular root cause; (2) a target component 114 for the action (e.g., a group of network elements or client attributes that are affected by the root cause); and (3) a quantified expected benefit component 118 from implementing the action on the target with respect to client experience and/or network performance.

Regarding the action component 110, the remediation recommendation interface 100 shows the action to be taken to mitigate the particular root cause as, "Alleviate poor coverage on 5 GHz." Regarding the target component 114, the remediation recommendation interface 100 shows the target of the action to be, "55.b.3-feldberg-offices3+49 impacted AP's." Regarding the quantified expected benefit component 118, the remediation recommendation interface 100 shows the quantified expected benefit from implementing the action on the target with respect to client experience and/or network performance to be 1000 client hours.

Additionally, in this embodiment of the remediation recommendation interface 100, the quantified expected benefit component 118 displays a breakdown of when the 1000 client hours benefit will occur through a time period of a week. Further, in this embodiment of the remediation recommendation interface 100, the top five affected APs (e.g., target components 114) are also shown, as well as their associated quantified expected benefit components 118 in client hours. The next top four affected APs (e.g., target components 114) and associated quantified expected benefit components 118 include: (1) ap-275-bluelight-r; 500 Client Hours, (2) ap-275-lightpole; 200 Client Hours, (3) 75.2.1-gryzmish-second; 10 Client Hours, and (4) 158.2.1-lemberg-childrenssecond; 10 CLIENT HOURS. Other sorting functions, navigations tools, and dropdown menus are also displayed in this embodiment of the remediation recommendation interface 100.

The action component 110, target component 114, and benefit component 118 will now be described in greater detail. The action component 110 of the remediation recommendation is designed to mitigate a particular root cause of the network incidents (e.g., alleviate 2.4 GHz co-channel interference), or more specifically, to take a particular action (e.g., turn off these 2.4 GHz radios). Other examples of the action component of the remediation recommendation include, by way of example only, and not by way of limitation: change configuration of the Dynamic Host Configuration Protocol (DHCP) server; increase transmission power on the Access Point (AP) (e.g., radios); and configure the correct Domain Name Servers (DNS) (e.g., clients), and the like.

The target component 114 of the remediation recommendation is a cohort of network elements or client attributes that the root cause is affecting. The target is the element or attribute that must be mitigated. In one embodiment, the remediation action may be to mitigate root cause X near the target of a "set of APs." In another embodiment, the remediation action may be to mitigate root cause Y on the target of the "VLANs for the servers." In still another embodiment, the remediation action may be to take action Z on the target of the "DHCP servers." Other examples of the target component of the remediation recommendation include, by way of example only, and not by way of limitation: all Windows 10® devices; VLANs 300 and 400; Servers X & Y; APs X, Y & Z on their 5 GHz radios, and the like.

The benefit component 118 of the remediation recommendation is a quantifiable benefit that describes the predicted result of taking the action on the target on future client experience and/or network performance of taking the action on the target. Notably, the benefit component is not an abstract or generalized benefit like "improve network performance." Instead, the benefit component is a quantifiable benefit that employs a standardized metric such as "client hours," which is described below. Examples of benefit components that are quantifiable benefits include "resolve 1000 client-hours of poor Wi-Fi experience" or "200 client-hours of client DHCP connectivity issues." Other examples of the expected benefit component include, by way of example only, and not by way of limitation: "reduce amount of average radius latency by 250 client-hours," "reduce amount of total traffic by 250 client-hours." Since these benefits are quantified with a common metric, the system and method for network incident remediation recommendation is able to rank, sort, and/or prioritize the numerous benefit options that may be presented to a user.

Client incident hours (or client-hours, for short) are the cumulative duration of a network issue over a certain time period, aggregated across all affected clients. Thus, for example, if a network incident has 100 affected clients over a two-hour duration, the total client-hours for that incident is 100*2=200. Similarly, for group of 100 network incidents over a week, where each incident is over a three-hour duration and has 100 clients, the total client-hours of this network issue is 100*3*100=30,000.

Client incidents may occur in different parts of the network, and affected clients may have different root-cause symptoms. The distribution of client-hours across different parts of the network and over various root-cause symptoms may thus point to systemic issues in the network. Such systemic issues can be identified readily using the concept of a network incidents-graph, as described below.

In another aspect of a system and method for network incident remediation recommendation, a secondary distinguishing characteristic of a remediation recommendation is that two or more remediation recommendations, which are related to each other with a natural "clustering," may be combined into a single remediation recommendation. In one example embodiment, if two or more recommendations are related to each other by the same root cause, they may be combined into a single remediation recommendation. In another example embodiment, if two or more recommendations are related to each other by the same recommended action, they may be combined into a single remediation recommendation. In still another example embodiment, if two or more recommendations apply to two different APs that are right next to each other, they may be combined into a single remediation recommendation. In this way, preferable remediation recommendations are intended to minimize the target of networks or client cohorts to receive an action, while maximizing the value for the expected benefit. Additionally, preferable remediation recommendations are also not redundant in terms of relating to the same underlying issue.

The following sections describe exemplary network incident identification and analysis systems 130 that may be used to obtain the network incident data necessary to generate network incident graphs for the system and method for network incident remediation recommendation to generate remediation recommendations.

Figure 1B:
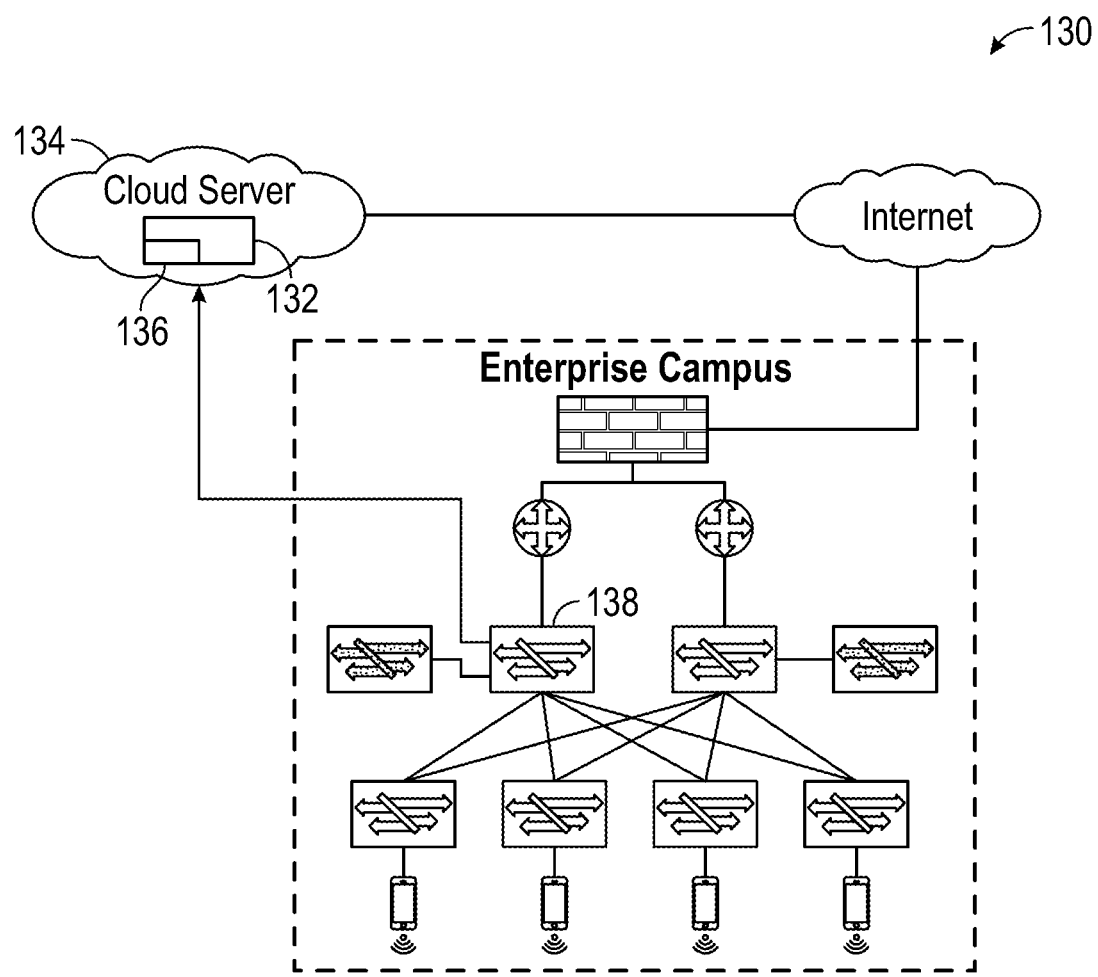
FIG. 1B illustrates system architecture of an exemplary network incident identification, analysis, and remediation system deployed in an enterprise network, according to one embodiment.

FIG. 1B illustrates system architecture of an exemplary network incident identification and analysis system 130 deployed in an enterprise network, according to one embodiment. The system 130 includes a manager 132 that is located in a cloud server 134. The cloud server may reside in a public or private cloud. The system 130 also includes one or more collectors 138 that send data to the manager 132. In one embodiment, the collector 138 is a software appliance (virtual or physical) that is located "on-premise" (i.e., on the premise of the enterprise network), and not at a remote Internet-linked location. In this embodiment, the collector is logic in a non-transitory computer readable memory that is executed by a processor to perform the actions described herein. In other embodiments, the collector is a combination of hardware and software. The collector receives live packets captured directly from physical and/or virtual network elements. The collector also receives data (e.g., topology, statistics, user information, and the like) from other enterprise systems including identity management systems, network element controllers (e.g., controllers, network management systems), and the like. In some embodiments, the collectors 138 transmit the data obtained from physical and/or virtual network elements of the enterprise network directly to an analytics system 136 of the system 130 (located remotely) for further examination. In some embodiments, the analytics system 136 is a sub-component of the manager 132 and is located in the cloud server 134. In some embodiments, the manager 132 in combination with the analytics system 136 runs the algorithms for identifying, analyzing, and remediating network incidents from cross-company real-time network data.

Continuing, within the context of the present application, the phrase "client perception of the infrastructure" is defined as a client-centric view of infrastructure factors including type, configuration, and state. For type, an example would be "60 percent of clients are connected to wireless controllers that are model X" instead of "60 percent of the wireless controllers are of model X." For configuration, an example would be "55 percent of clients are connected to a DHCP server with IP conflict detection enabled." Finally, an example of state would be "70 percent of clients are connected to an access point with greater than 100 simultaneously associated clients."

Figure 1C:
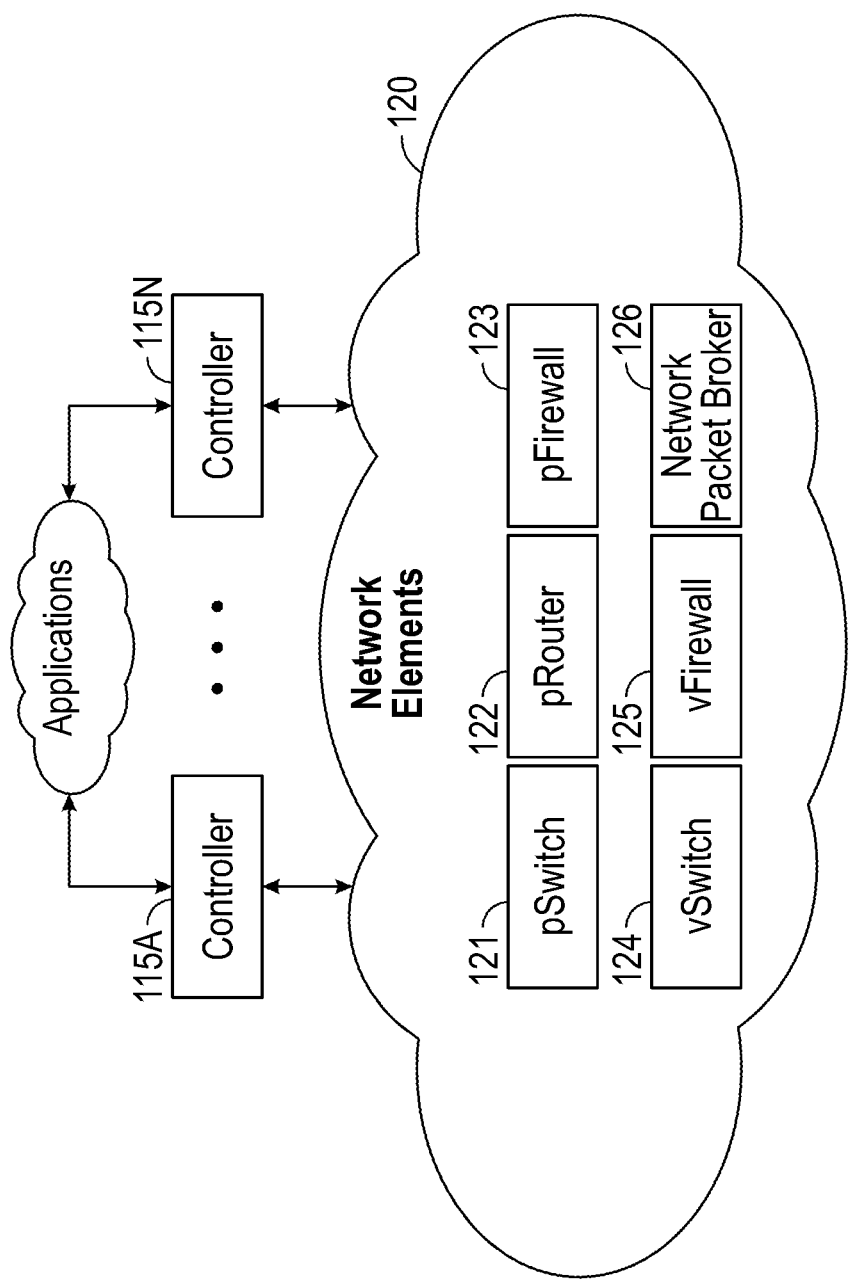
FIG. 1C illustrates a functional diagram of a network, according to one embodiment.

Referring now to FIG. 1C, a functional diagram of an enterprise network is illustrated for which the system and method for network incident remediation recommendation may be employed. The network includes applications and network elements 120 that are linked via one or more controllers 115A-115N. The "p" and "v" prefixes on the network elements 120 indicate physical and virtual network elements, respectively.

The network elements 120 include a physical switch (pSwitch) 121, a physical router (pRouter) 122, a physical Firewall (pFirewall), a virtual switch (vSwitch) 124, a virtual firewall (vFirewall) 125, and a physical network packet broker 126. It is appreciated that the network elements 120 can include any number of physical switches 121, physical routers 122, physical firewalls 123, virtual switches 124, virtual firewalls 125, and physical network packet brokers 126, and other physical or virtual network elements, without deviating from the present disclosure. All of these elements can be physical or virtual, and the wireless controller can be logical or physical, located either on-premise in its own physical appliance, within an AP, or in the cloud.

Network functions virtualization (NFV) refers to the implementation and deployment of software-based network elements. Such software-based network elements typically run on generic processing hardware (e.g., x86 machines) as opposed to non-NFV network elements that require dedicated hardware (e.g., Application-Specific Integrated Circuits (ASICs)). Examples of NFV-type network elements include, but are not limited to, a virtual switch 124 and a virtual firewall 125. It is appreciated that other types of NFV-type network elements may be implemented without deviating from the present disclosure. Such NFV-type network elements may be run as a virtual machine on top of a hypervisor that runs on commodity hardware. The present system and method provides monitoring and controlling of NFV and/or non-virtualized network elements.

An application delivery network (ADN) encapsulates several technologies that provide application-layer functionality in the network. A next generation application firewall, for example, is an appliance that provides inline access control functionality as a function of L4-L7 header information as well as application, user and content layer metadata. This appliance can perform inline deep packet inspection to identify applications in real-time and perform access control.

The control embodiments of the present system and method provide capabilities of controlling basic network elements such as switches and routers and wireless controllers, to the end of programming policies including security and/or quality related. The present system and method can reduce hardware and distributed functionality.

The network packet broker 126 (or a matrix switch) gathers, aggregates and filters network traffic from port mirrors, network TAPs, and probes. The network packet broker 126 serves the filtered network traffic to network security and performance tools as per their network security and performance tools. For example, a network security and performance tool may only support 1 GBps[Gbps? global] of traffic, and a network packet broker 126 can be manually configured to filter and shape traffic from a 10 GBps link to conform to the constraint of the network security and performance tool. Typically the network packet broker 126 is decoupled from the network security and performance tools to which it delivers the packets.

A portion of the present system and method performs as a network security and performance tool. In one embodiment, the present system and method intelligently and dynamically programs a network packet broker 126 to gain access to the traffic it needs. The present system and method also summarizes and indexes higher-layer information about users, applications, devices, behaviors, and the like (e.g., via machine learning), and enables the higher-layer information to be queried using a natural language processing technique. According to one embodiment, the present system and method is deployed in a cloud to enable advanced analytics and cross-network learning. "Cloud" herein refers to a computer and storage platform service hosted over a wide area network (e.g., the Internet). It is noted that both ADN and network security/performance monitoring tools are typically deployed on-premise.

The present system and method observes and controls a programmable network via higher-layer attributes, and addresses the drawbacks of prior systems for monitoring and controlling networks. The discussion is divided into three sections: (1) architecture, (2) visibility, and (3) control.

Architecture

Figure 2A:
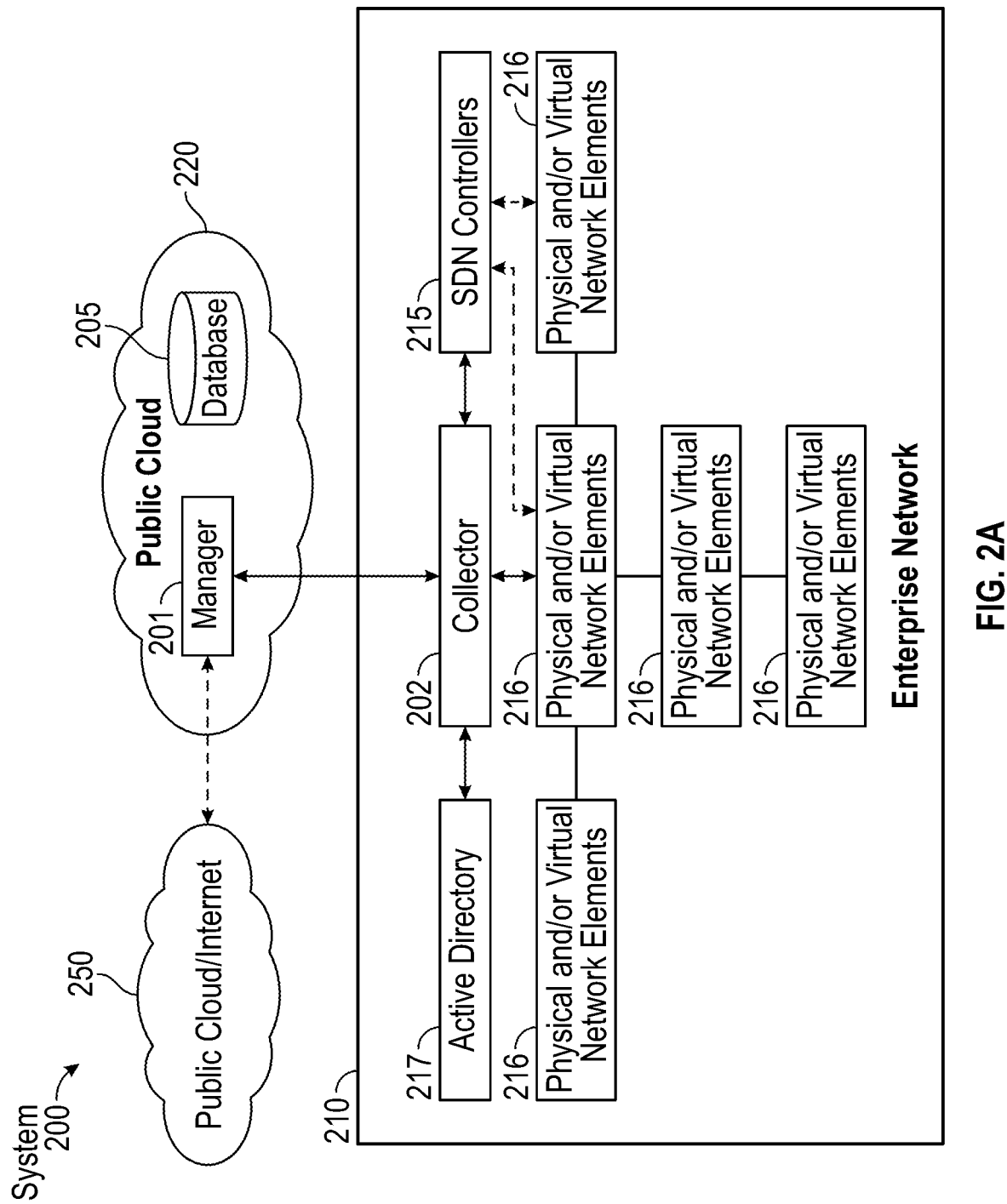
FIG. 2A illustrates system architecture of an exemplary system deployed in an enterprise network, according to one embodiment.

FIG. 2A illustrates system architecture of an exemplary system deployed in an enterprise network, according to one embodiment. The system 200 includes a manager 201 (or Loupe Manager) and one or more collectors 202 (herein referred to as Loupe Collectors). In one embodiment, the collector 202 is a software appliance (virtual or physical) that is located on-premise. The collector 202 may be deployed as a single software element, or for scaling a cluster of, or several, software elements. For example, the collector 202 is logic in a non-transitory computer readable memory that can be executed by a processor to perform the actions described herein. In other embodiments, the collector 202 is a combination of hardware and software.

According to some embodiments, there are multiple collectors 202 per enterprise network 210 (e.g., a campus, a data center) and multiple networks 210 and collectors 202 per customer. Moreover, the collectors 202 can be deployed behind firewalls within an enterprise network 210. This enables the collectors to easily communicate with enterprise systems on-premise and also behind the firewall to easily communicate outbound with systems off-premise.

The collector 202 receives live packets captured directly from physical and/or virtual network elements 216. The collector 202 also receives data (e.g., topology, statistics, user information, and the like) from other enterprise systems including identity management systems (e.g., active directory 217), network element controllers (e.g., SDN controllers 215, network management systems), and the like. The collector 202 also runs performance tests against on/off-premise applications in the public cloud/Internet 250 (e.g., BOX®, MICROSOFT OFFICE365®, GOOGLE®, WEBEX®, WORKDAY®, SALESFORCE®) and collects the performance results.

The collector 202 captures all of these data, extracts key metadata or features, and compresses and sends the key metadata or features to the manager 201 that is located in a public cloud 220. For example, the collector 202 receives 10 s or 100 s of gigabits per second of data, but only sends 10 s or 100 s of kilobits per second of data to the manager 201. The collector 202 is provisioned and configured by the manager 201, thus the commands from the manager 201 towards systems that are on-premise can be proxied via the collector 202. In one embodiment, the manager 201 may also be deployed in a private cloud or elsewhere within a large multi-site organization.

The manager 201 summarizes and stores the data received from the collector 202 in a database 205. The manager 201 performs additional data collection from off-premise enterprise systems and other applications over the public cloud/Internet 250 and runs its own performance test. The manager 201 applies learning and other heuristic algorithms on the data, and binds higher-layer information (e.g., about users, applications, devices, and behaviors) to the data. The manager 201 also computes the crawling schedule for the collectors 202 to receive data from different parts of the network. The manager 201 is also responsible for providing an Internet interface and a natural language query capability to retrieve ranked answers based on the learned data. Similar to the collector 202, the manager 201 is a software appliance that can be deployed in a cluster or in multiple tiers. The manager 201 contains a database 205 that can support large data storage and efficient queries (e.g., BigTable®). Generally, there can be one manager 201 for many organizations and/or enterprises (e.g., multi-tenant style deployment), or multiple managers 201 for multiple organizations and/or enterprises. The manager 201 may also be logic in a non-transitory computer readable memory that can be executed by a processor to perform the actions described herein or a combination of hardware and software.

Figure 2B:
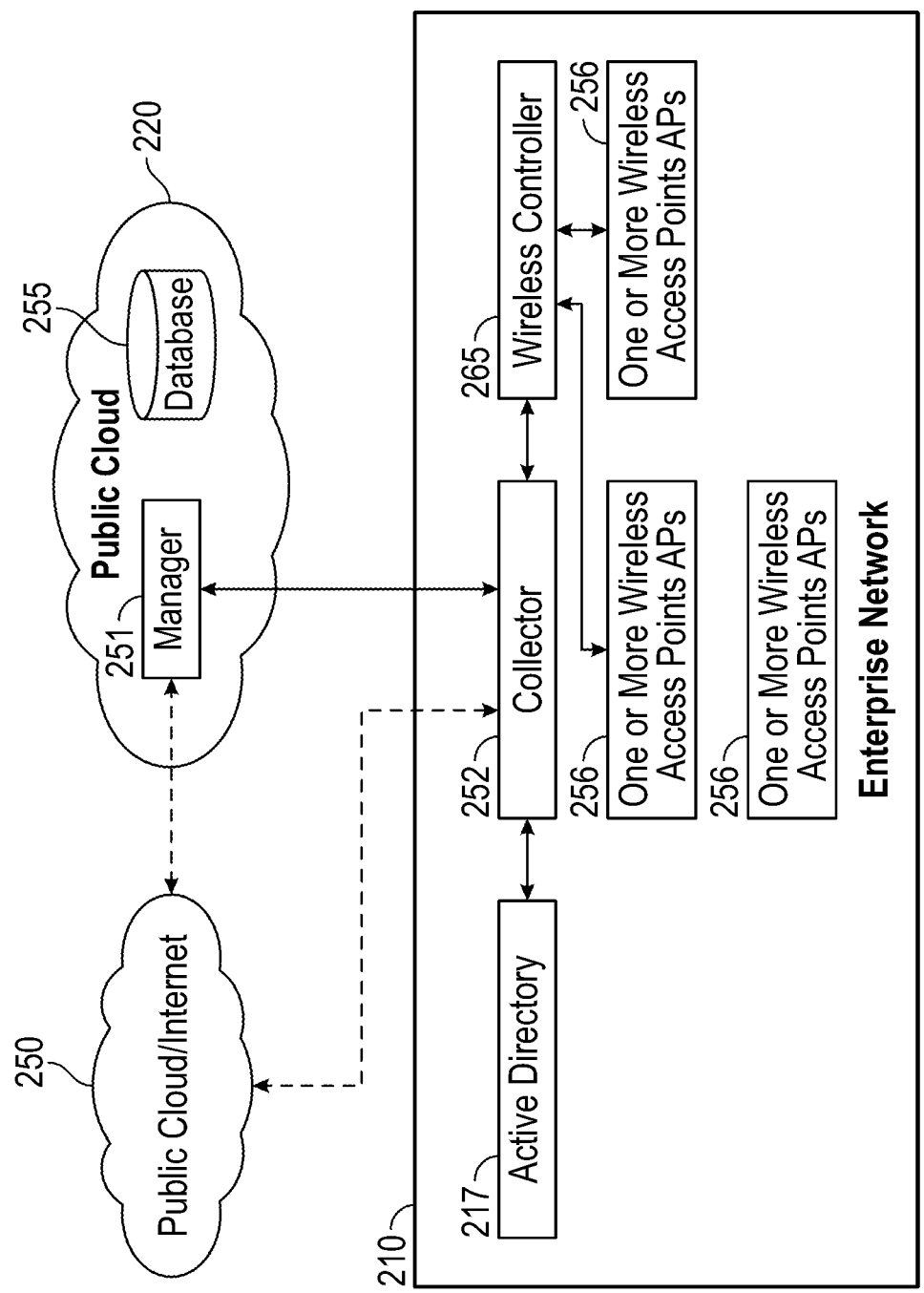
FIG. 2B illustrates system architecture of an exemplary system deployed in an enterprise network, according to another embodiment.

FIG. 2B illustrates system architecture of an exemplary system deployed in an enterprise network, according to one embodiment. The system 200 includes a manager 251 on a server 255, a collector 252, a wireless controller 265 that controls one or more wireless access points (APs) 256. The wireless controller 265 may take many forms, for example, (i) a separate on-premise software running on its own hardware, (ii) software that is integrated into the access points 256, or (iii) software located off-premise (e.g., in a cloud 220). The wireless controller 265 controls and/or configures the access points 256 and terminates data plane traffic coming from mobile devices that are wirelessly connected to the access points 256. The wireless controller 265 is an example of a network element, as well as a controller that controls several other network elements (e.g., access points 256).

The collector 252 collects wireless metrics from the controller 265 via a management interface (e.g., simple network management protocol (SNMP), command-line interface (CLI), proprietary management protocol). Examples of these metrics for a mobile device include, but are not limited to: signal strengths, layer 2 traffic statistics (e.g., packets transmitted, retried, dropped), traffic transmission rates, device location, and user information. Examples of these metrics for an access point include, but are not limited to: channel utilization, aggregated layer 2 traffic statistics, interference measurements, CPU/memory utilization.

The collector 252 simultaneously collects metrics and other information from other enterprise systems where available, via their respective management interfaces. One example is collecting user role as well as user-to-IP address information from a directory server (e.g., LDAP, Active Directory). Another example is collecting unified communication performance metrics from a Microsoft Lync Server).

The collector 252 simultaneously sees network traffic via a mirrored interface via a logical or physical port mirror off of the wireless controller 265, or a logical or physical port mirror off of another network element (e.g., switch, router, access point) in the network where relevant user traffic is carried.

From the traffic, the collector 252 performs deep packet inspection (DPI) and extracts, in addition to general protocol level metadata, user/device quality of experience (QoE) related metadata, differing on an application-by-application basis. For example, Internet browsing QoE metrics include page load times and/or HTTP URL response times. Voice and video application QoE metrics involve extracting and/or computing the relevant mean opinion score (MOS) values.

According to some embodiments, the present system and method time aligns the QoE metadata with metadata extracted across the application stack including the wireless layer metrics from the wireless controller 265. For example, at a particular time interval, a user/device may have poor page load times, high transmission control protocol (TCP) retransmits, low signal-to-noise ratio (SNR), and high AP channel utilization. The present system and method collects and stores this time series data, and analyzes the time series data for trends/patterns over time and other dimensions (e.g., device type, location). For example, the present system and method finds that ANDROID® devices suffer consistently worse Internet performance than IOS® devices.

According to some embodiments, the present system and method analyzes for trends/patterns across networks. For example, the present system and method identifies the specific network/protocol/wireless metrics to determine the application performance. As an example, the present system and method analyzes a bad Microsoft Lync® voice application performance (e.g., mean opinion score (MOS)) across many customer networks. The present system and method learns that the most important indicator is high levels of layer 2 packet retransmissions. Based on this assessment, the present system and method predicts, for a new customer network that has high levels of layer 2 packet retransmissions, that Microsoft Lync® performance would be poor unless the packet retransmissions problem is rectified.

The present system and method has applicability to two types of implementations: visibility and control. From an architecture perspective, there is a difference between deployment possibilities between the two implementations. In particular, for passive visibility only, the present system and method can be deployed out-of-band.

Figure 3:
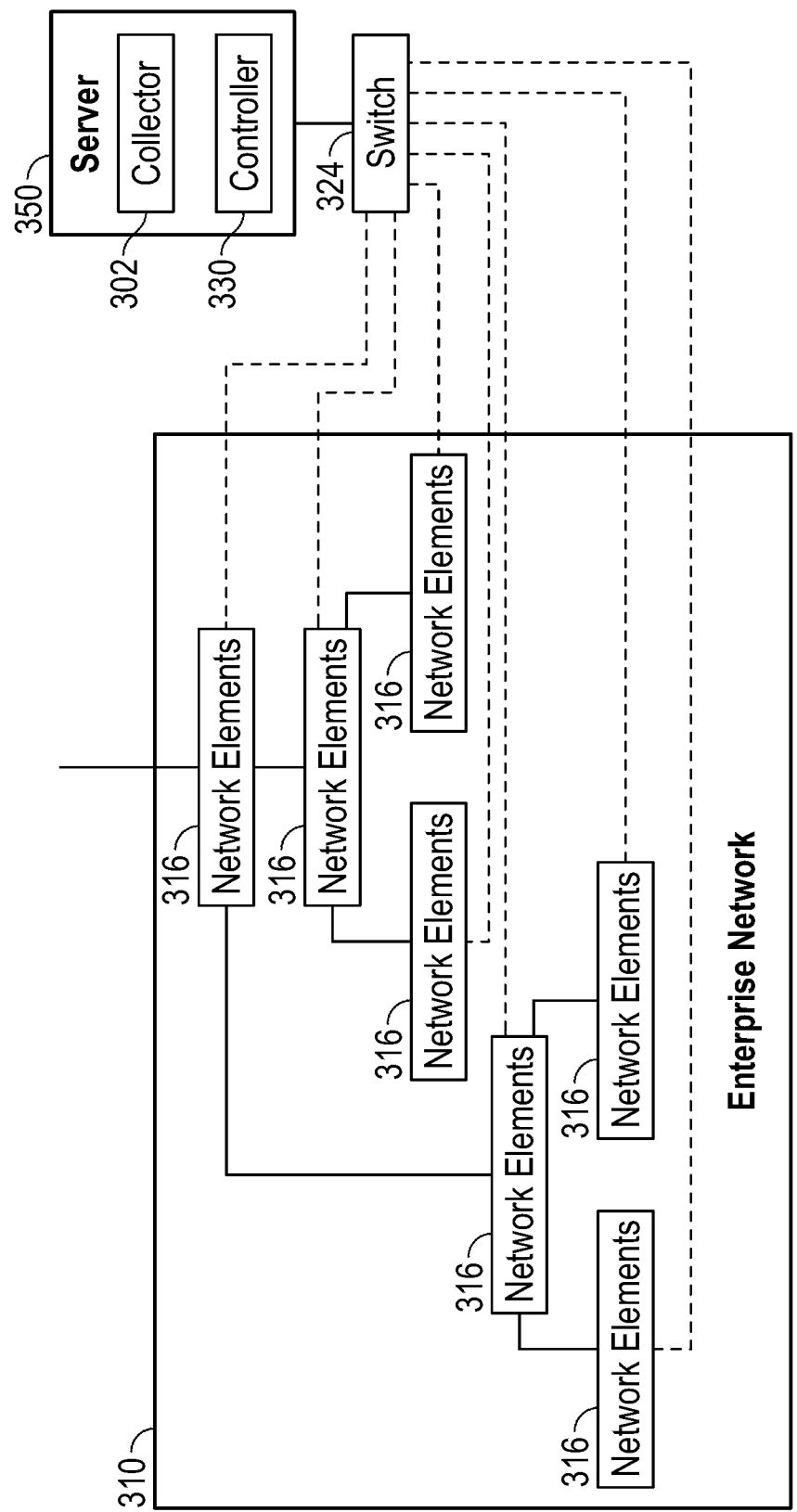
FIG. 3 is a block diagram of an out-of-band deployment, according to one embodiment.

FIG. 3 is a block diagram of an out-of-band deployment, according to one embodiment that includes an enterprise network 310, a switch 324, and a server 350. The programmable switch 324 receives mirrored traffic of network elements 316 and communicates with the server 350 including a collector 302 and a controller 330. The mirrored traffic (as indicated in dotted lines) from the network elements 316 is forced through the programmable switch 324. The programmable switch 324 can be dynamically controlled and programmed to direct specific traffic during specific time intervals and network locations to the collector 302. For example, the controller 330 controls the programmable switches 324. In a case where the total bandwidth of the traffic being monitored is less than the bandwidth of the collector 302, the programmable switch 324 may not be necessary, and all mirrored traffic can be directly sent to the collector 302. An example of this case is where only the wide area network (WAN) links within an enterprise network are monitored.

For a control-based implementation, the present system and method employs an inline deployment, according to some embodiments. In this implementation, a subset of the network elements carrying regular traffic (e.g., non-mirrored traffic) is programmable. Moreover, these network elements (e.g., physical and virtual switches, wireless access points) may be located such that the policy can be effective, for example, to form a physical or logical choke point.

Figure 4:
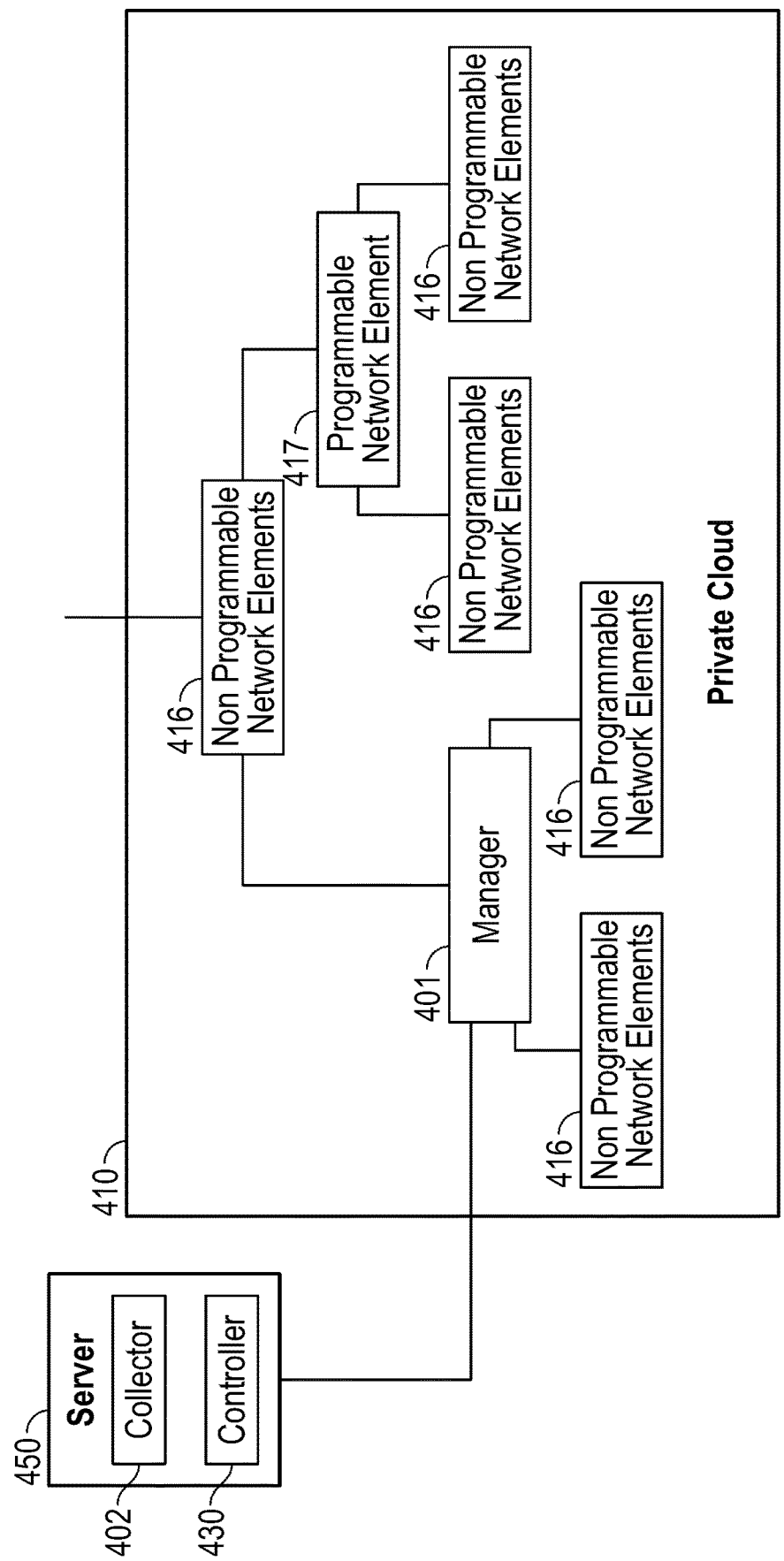
FIG. 4 is a block diagram of an inline deployment, according to one embodiment.

FIG. 4 is a block diagram of an inline deployment, according to one embodiment that includes a private cloud 410 and a server 450. A manager 401 in the private cloud 410 receives traffic from non-programmable network elements 416 and programmable network element 417 and communicates with a server 450 including a collector 402 and a controller 430. In this embodiment, the manager 401 is deployed on-premise in a private cloud 410, but it is apparent that the manager 401 can be deployed off-premise in a public cloud as illustrated in FIGS. 2A and 2B.

The manager 401 located in a cloud is capable of observing across multiple customer networks. While the manager 401 (whether it is a multi-tenant manager or a separate manager per customer) may be deployed in a private or public cloud to preclude sharing of data across multiple networks, the present system and method may achieve overall performance improvement by combining trained algorithms from each of the customer networks.

Visibility

The present system and method provides crawling and indexing the network and enables natural language query about the network and applications, users, devices and behaviors. The specific flow for network visibility is in the following order:

RAW DATA→CRAWLING→FEATURES EXTRACTION→SUMMARIZATION→INDEXING→ADVANCED ANALYTICS AND CROSS-NETWORK-LEARNING→QUERY-ABILITY

Figure 5:
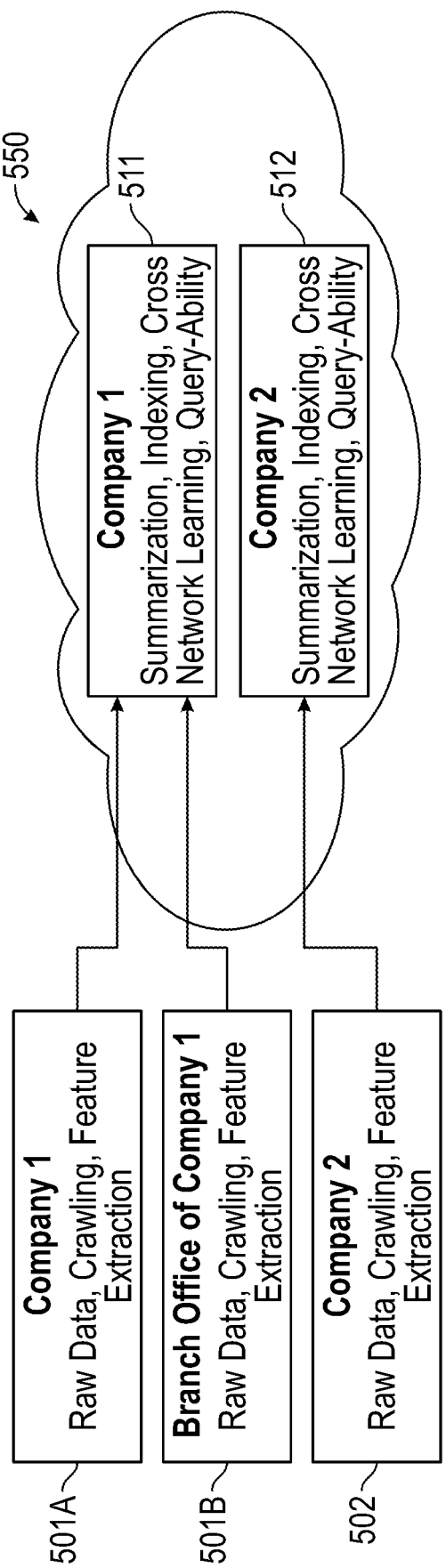
FIG. 5 is a flow diagram for providing network visibility, according to one embodiment.

FIG. 5 is a flow diagram for providing network visibility, according to one embodiment. The RAW DATA→CRAWLING→FEATURES EXTRACTION pieces occur on-premise (e.g., collectors of Company 1 (501A), a branch of Company 1 (501B), Company 2 (502)), and the SUMMARIZATION→INDEXING→ADVANCED ANALYTICS AND CROSS-NETWORK LEARNING→QUERY-ABILITY pieces occur in a cloud 550 (e.g., managers of Company 1 (511) and Company 2 (512)). It is noted that these functionalities may be split across a manager and a collector in a variety of ways without deviating from the scope of the present disclosure. For example, partial summarization can occur in the collector as opposed to the manager. Furthermore, the manager's functionalities can itself be broken apart into several pieces and implemented on a distributed computing system consisting of multiple different components. An example is the case where the data-summarization and data-analytics are performed on two separate multi-machine systems that communicate with each other.

Raw Data

The raw data includes data that can be collected or crawled by a collector or a manager. The first piece of raw data that is crawled is a live traffic on the network that can be accessed by one or more collectors. The raw data can further include statistical, topological and configuration data—received either from network elements directly, or via an intervening controller or a manager. Examples of raw data include, but are not limited to, sampled flow (sFlow®) and SNMP data harvested from network elements. Similarly, topology information can be gleaned from a controller if available. Other information gleaned from other enterprise systems (on- or off-premise) is also applicable; for example, user information received from an ACTIVE DIRECTORY® server.

The raw data also includes the results from pro-active performance tests with respect to on- and off-premise applications. In one embodiment, the collector runs proactive performance tests (e.g., HTTP GETs, PINGs) with various target applications. These target applications can be automatically detected by the present system and method or specifically user preconfigured.

Crawling Raw Data

Crawling herein refers to an act of dynamically selecting a different set of raw data for the collectors to examine at any given time. For example, crawling includes observing different physical or virtual links, and applying different filters to the raw data.

In many cases, the total amount of traffic exceeds the bandwidth of a collector. This necessitates a device with network packet broker equivalent (NPBE) functionality that is capable of driving mirrored and filtered traffic from multiple parts of the network to the collector. The present system and method dynamically programs one or more NPBE devices with filtering and steering rules to get selected access to the data. However, the present system and method also is applicable to a case where the traffic mirrored to the collector comes from a small number of locations (e.g., mirrored traffic from WAN links), and when the total simultaneous mirrored traffic is less than the bandwidth of the collector. This case may not require a NPBE device. In one embodiment, the NPBE is one or more software elements, for example, running as part of the collector.

"Crawling" the raw data is a significant problem, especially in situations where the disclosed system and method dynamically controls one or more NPBEs within the network to capture packets from different parts of the network at different times. In one embodiment, NPBE functionality is implemented by a controller operating on top of a switch. In this case, the manager, either directly or proxied via the collector, can command the controller to have the underlying network elements implement the NPBE functionality.

The method for controlling the network packet broker equivalent is for the manager to compute a dynamic crawling and filtering schedule that informs the NPBE on how it may steer traffic to the collector. The computation of the dynamic crawling and filtering schedule may be done in a variety of ways; for example, but not limited to, as a function of topology, computation and network resources at the collector, and statistics.

An example of a dynamic crawling and filtering schedule is: Send all ingress and egress traffic from link e1 to the collector; From link e2, send ingress and egress traffic with source or destination port equal to 80 to the collector; and Cycle through links e3, e4, e5 and e6, 5 minutes at a time, sending all traffic to the collector.

A dynamic crawling and filtering schedule with more complicated logic may be sent to the collectors. For example, collectors can be provisioned with a program that searches for a dynamic trigger to alter the schedule. For example, the dynamic trigger is: "if an application X is detected and is using Y bandwidth, then monitor traffic from the link more frequently." In another embodiment, the dynamic crawling and filtering schedule is computed to optimize load balancing between collectors, for example, "send the 1 GBps of traffic from link e1 to collector #1 and the 1 GBps of traffic from link e2 to collector #2."

According to one embodiment, the collector crawls performance information of on- and off-premise applications that the present system and method detects use of, or that is preconfigured by a user. The performance information may be generated by the collector performing performance tests (e.g., PING, TRACEROUTE, HTTP GETs) against the applications. The performance information can be crawled by periodically running the same HTTP GETs against a target application that is preconfigured or automatically detected, and sending to the manager the detected results. The crawling schedule may include a command, for example, "if a new application is detected, then immediately start running performance tests against it."

According to some embodiments, the raw data can be collected from a controller or a network management system in the following process: Global view of L1→L7 Network Topology, Port statistics for each network element, if available, Current Configuration of each network element under control, Configuration Capability of each network element under control, API functionality and configuration capabilities of the controller itself, any higher-layer information available regarding users, applications, devices, locations, and the like.

According to some embodiments, the raw data can be collected from an enterprise system (e.g., ACTIVE DIRECTORY®, light directory access protocol (LDAP) servers, single sign-on (SSO) system). Examples of such raw data include, but are not limited to, user information such as roles and associated policies, login status, and IP address.

According to some embodiments, the raw data can be collected from network elements directly (e.g., by way of a priori instructions given to a controller) in the following process:

Sampled mirrored traffic from various ports in the network, Advanced statistics such as sFlow®, netFlow®, Previously computed information regarding users, applications, devices, locations, and signal strength, error-rate, and other performance related information.

According to some embodiments, the raw data can be collected from the present system or other policy engine, such as desired high-level policies. According to some embodiments, Performance data generated by the collector includes results of proactive tests (e.g., PING, HTTP, TCP) performed by the collector on detected or user preconfigured on/off-premise applications.

Figure 6:
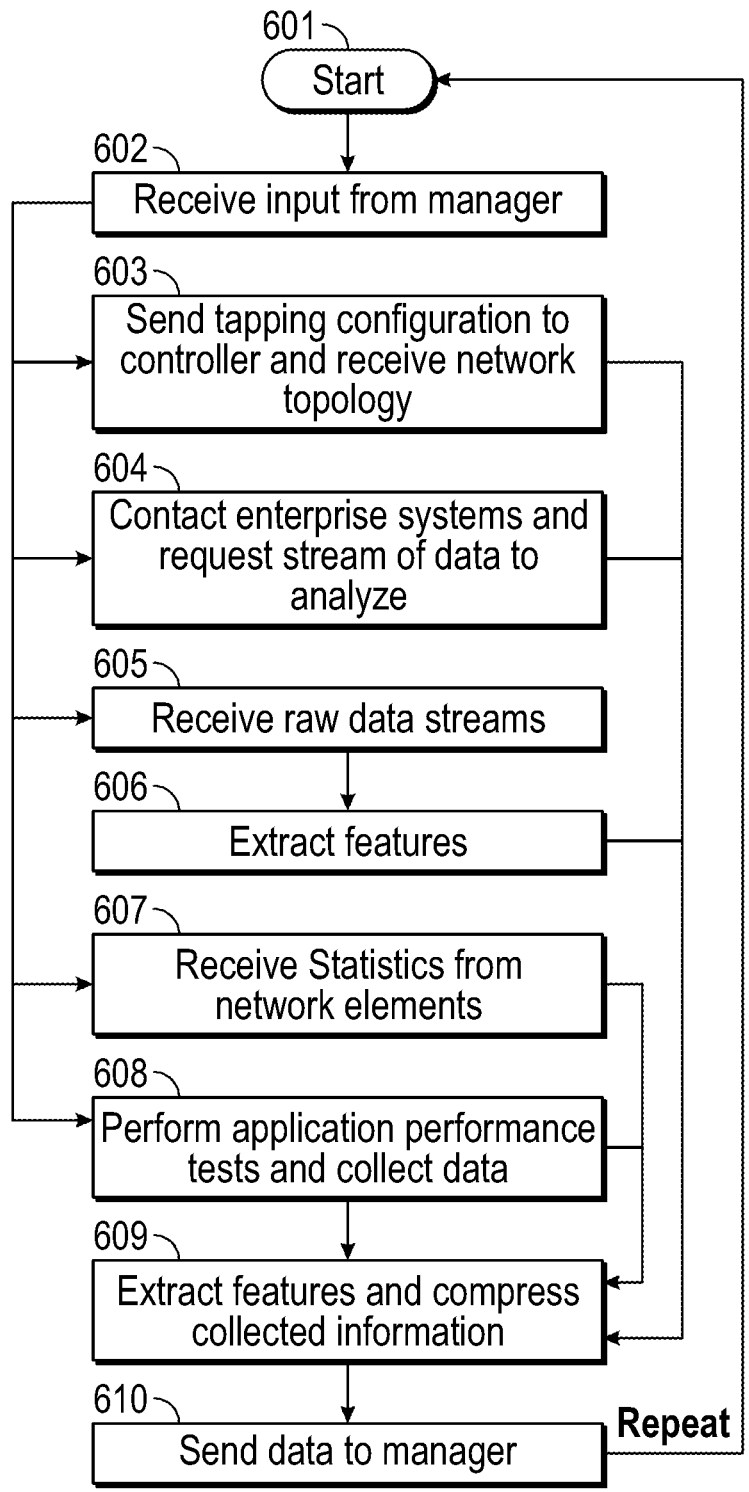
FIG. 6 is a flow diagram of an input collection process at the collector, according to one embodiment.

FIG. 6 is a flow diagram of an input collection process at the collector, according to one embodiment. The input collection process starts (at 601) and a collector receives inputs from a manager (at 602). Examples of inputs include, but are not limited to: instructions on which enterprise systems to collect data from and how to collect the data (e.g., IP address, credentials), sampling schedule for data collection from network elements, instructions on initial analysis, filtering, compression of collected data, and list of applications to run performance tests.

The collector further sends desired tapping configuration to the controller and receives network topology (at 603), contacts the enterprise system and requests a stream of data to analyze (at 604), receives sampled raw data streams identified by time and link (at 605) and extracts features from the received sampled raw data streams per instructions (at 606), receives advanced statistics from network elements (at 607), and performs application performance tests and collects data (at 608). The controller further extracts features using information collected from 603-608, and compresses collected information (at 609). The controller sends data to the manager (at 610), and repeats the input collection process.

Feature Extraction

According to one embodiment, the present system and method extracts key features and/or metadata from the crawled data. For example, packets are streaming into the collector at multiple gigabits per second speeds. The collector extracts a set of features on a flow-by-flow or a host-by-host basis from millions of packets per seconds and tens of thousands of flows per second, and sends the extracted data to the manager in less than a few hundred bytes per second per flow. In one embodiment, a flow is defined by the 5-tuple of (src1P, dst1P, srcPort, dstPort, protocol). The definition of a flow may be expanded to apply to other primitives such as application or other combinations of packet header fields (e.g., Layer 2 flows include source and destination media access control (MAC) addresses in the definition of a flow).

Examples of a flow-by-flow feature include, but are not limited to: Number of different HTTP2xx RESPONSE packets; Number of different HTTP3xx RESPONSE packets; Number of different HTTP5xx RESPONSE packets; Binary feature of whether IP Traffic is present; Number of different types of HTTP packets; Number of different types of DNS packets; Number of different types of DHCP packets; Binary feature of whether TCP_SYN was followed by TCP_SYN_ACK; Binary feature of whether DNS_Q was followed by DNS_SUCC_RESP; Binary feature of whether DHCP_REQUEST was followed by DHCP_GRANT; Set of source/destination MAC addresses present in the flow; Each of the above features on a time slice by time slice basis (e.g., every 10 seconds of a flow); Mean, median and variance of packet inter-arrival times, payload sizes; Flag indicating whether window scaling was requested; Number of TCP FIN packets seen.

Examples of a host-by-host feature include, but are not limited to: Number of different hosts a particular host interacts with; Set of hosts that interact with each other; Number of ports used for transactions (indicates server vs. client).

Examples of application-level metadata include, but are not limited to: HTTP response and page load times; Voice and video call MOS scores; Response times of other protocols (DNS, DHCP, RADIUS, and the like).

Small raw data (e.g., statistics, topology) can be compressed and sent to the manager. However, intelligent feature extraction is required to send a large data to the manager. An example of a large data is statistical data (e.g., average link utilization). Similarly, the performance test results might be reduced down to specific features (e.g., average HTTP response time, presence of an anomaly in the performance test).

Figure 7:
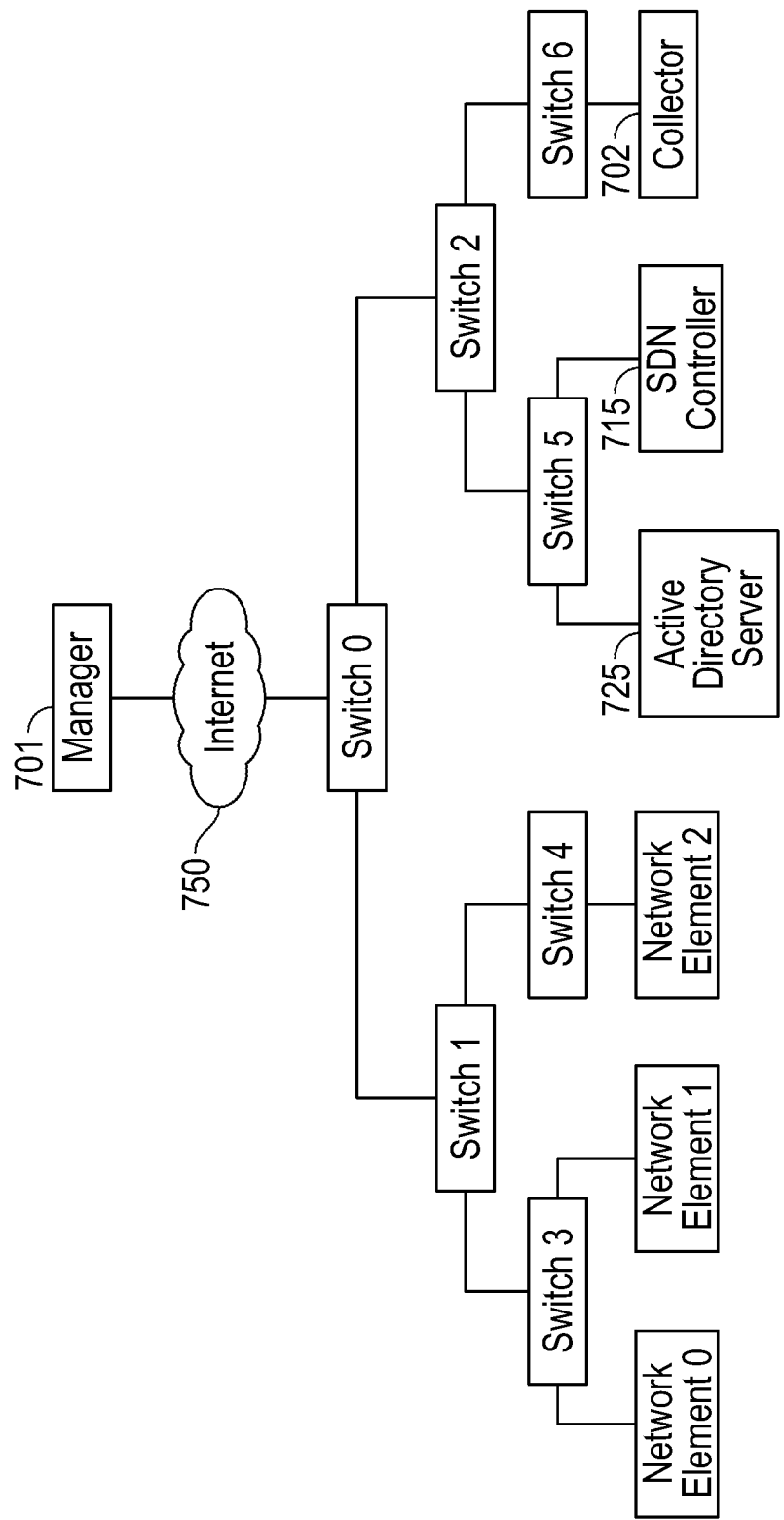
FIG. 7 illustrates a diagram of an exemplary network, according to one embodiment.

FIG. 7 illustrates a diagram of an exemplary network, according to one embodiment. Seven switches (switch 0-switch 6) and three network elements (network element 0-network element 2) are arranged hierarchically. The top switch (switch 0) is connected to the Internet 750, and a manager 701 is deployed in a server in the public cloud and connected via the Internet 750. A collector 702 is deployed as a virtual machine (VM) on a server attached to switch 6. A SDN controller 715 is deployed as a server attached to switch 5. An active directory server 725 is also connected to switch 5. Switch 5 and switch 6 are connected to switch 2. Network element 0 and Network element 1 are connected to switch 3. Network element 2 is connected to switch 4. Switch 3 and switch 4 are connected to switch 1. Switch 1 and switch 2 are connected to switch 0.

Figure 8:
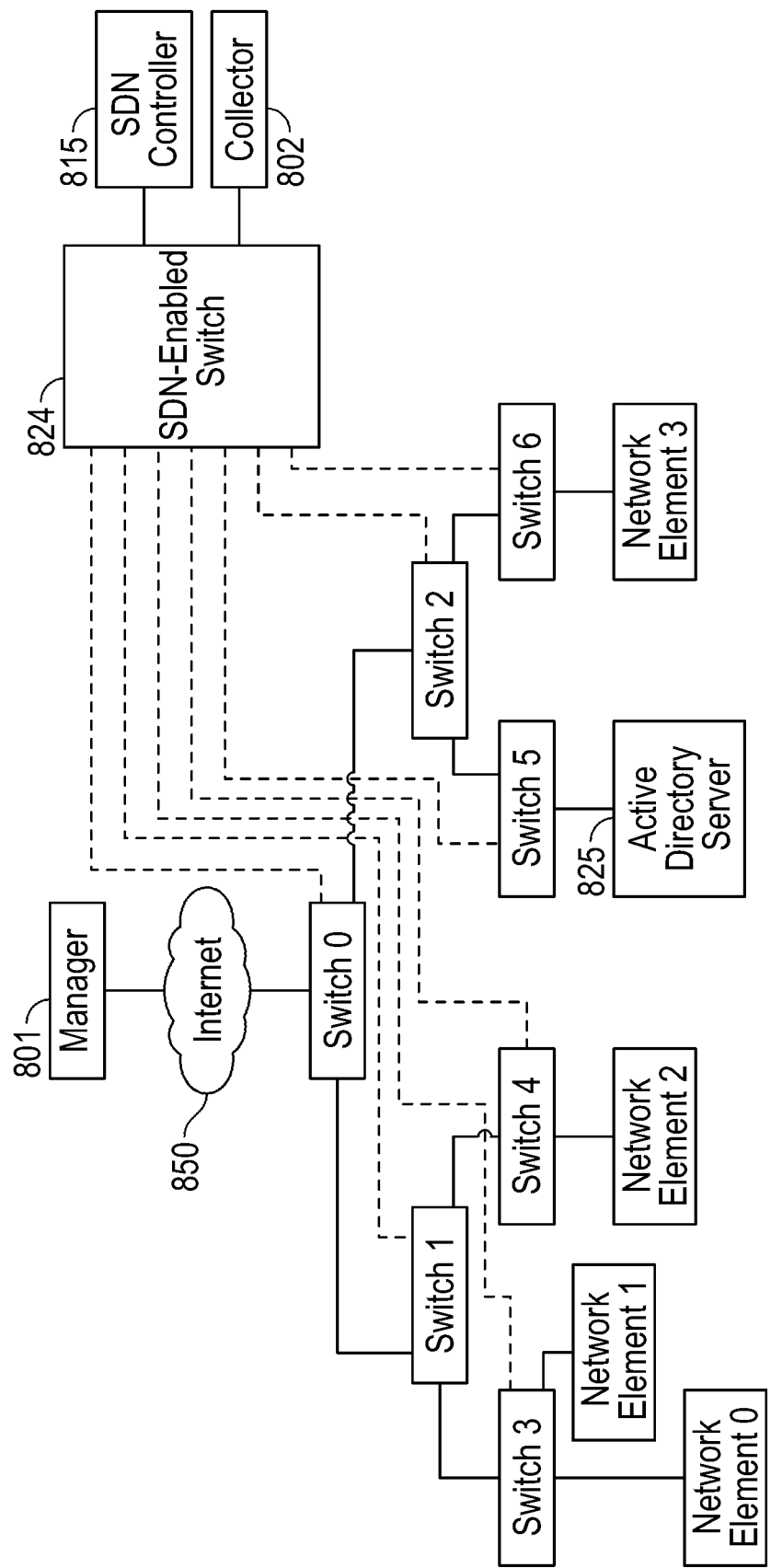
FIG. 8 illustrates a diagram of an exemplary legacy network including a switch, according to one embodiment.

FIG. 8 illustrates a diagram of an exemplary legacy network including a switch, according to one embodiment. Seven switches (switch 0-switch 6) and network elements (network element 0-network element 2) feed mirrored traffic (as indicated by dotted lines) into a SDN-enabled switch 824. The mirroring configuration is static and, as an example, may simply mirror the traffic from each switch's uplink. The collector 802 and controller 815 are deployed are servers that are connected by ports to the switch 824. The manager 801 is deployed in a server in the public cloud and connected to the switch (switch 0) over the Internet 850. An active directory server 825 is also connected to switch switch 5. It is noted that mirror ports can be manually configured without the presence of a switch.

The collector 802 dynamically captures packets from multiple links in the network. As an example, the link to the collector is a 2 GBps link (e.g., 2 link-aggregated 1 GBps links), and other links (including the WAN link) are 1 GBps links. In this case, the manager may send a crawl schedule to the collector, for example: Collect the features on the WAN link (e0) 100 percent of the time, and Continuously cycle through links e3, e4, e5, e6 (i.e., certain of the depicted links) for five-minute stretches, and collect all the features during that time.

Summarization and Indexing

Summarization and indexing functionalities are implemented in a manager, although it is possible to embed some or all of this functionality in a collector as well. The summarization and indexing processes take input features and other relevant data from the collector(s) and other systems. The first outputs of the summarization and indexing processes are higher-layer inferences, or bindings. Specifically, the relationship or binding of higher-layer data (e.g., users, applications, devices) to lower-layer data (e.g., IP and MAC addresses, ports) is computed and indexed in a database. The present system and method provides a capability to query using natural language and high-layer control primitives, and any high-level indexed information, both current and historical.

The lower-layer data may vary depending on an objective such as network visibility or network control. For network visibility, the lower-layer data includes, but is not limited to, protocol level metrics and metadata. For network control, the lower-layer data includes, but is not limited to, control primitives such as ports, MAC addresses, IP addresses, an access control list (ACL), quality of service (QoS), and rate limit setting. According to one embodiment, the present system and method predicts performance of one or more of an application, a user, and a device based on observed characteristics of the network around network protocol level metrics and metadata.

Figure 9:
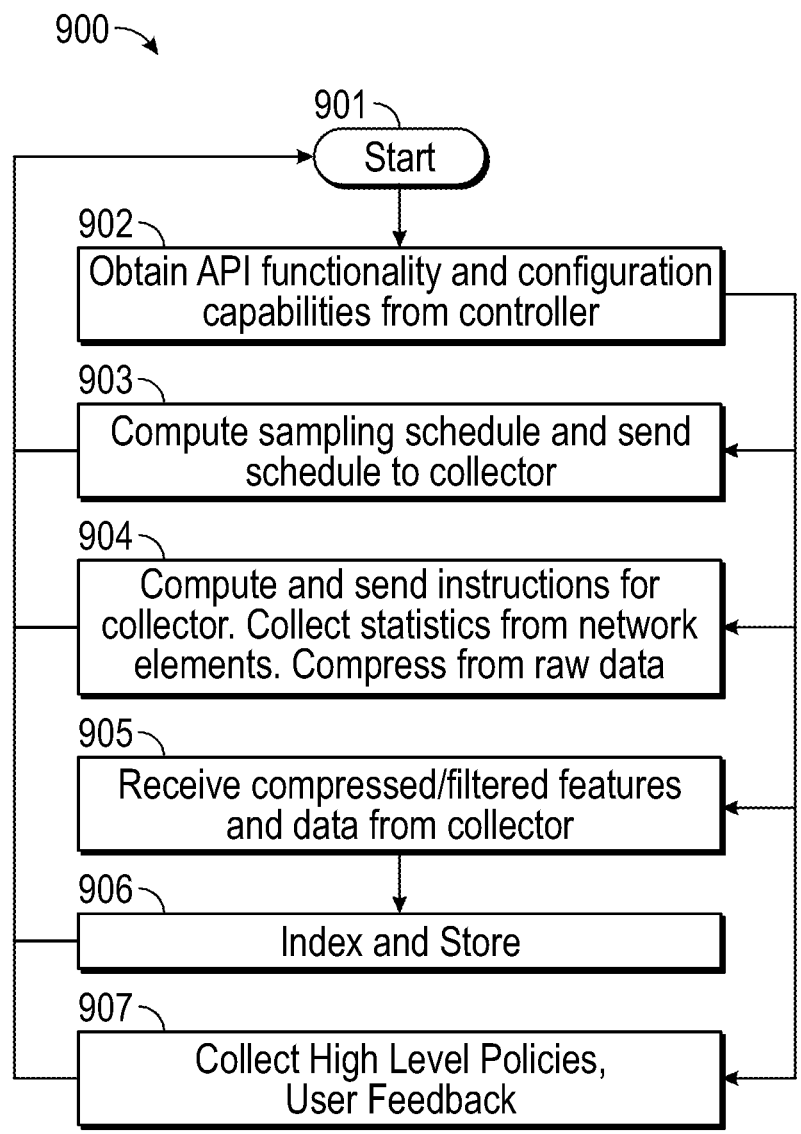
FIG. 9 is a flow diagram of an exemplary information collection process, according to one embodiment.

The main role of the summarization process is to store and learn from the inputs received from the collector(s) and other enterprise systems. FIG. 9 is a flow diagram of an exemplary information collection process 900, according to one embodiment. The collection process starts (at 901) as a manager obtains API functionality and configuration capabilities from a controller (at 902). The manager computes a sampling schedule as a function of a desired performance objective and topology and sends the sampling schedule to the collector (at 903). The manager also computes and sends instructions for the collector to interact with the controller and other enterprise systems, collect advanced statistics from network elements, and determine how to analyze, filter, and compress from raw data (at 904). The manager also receives raw compressed, filtered features, and other data from the collector (at 905), and indexes and stores the received raw features and data in a database in terms of using time, link and other aspects such as source IP address, as keys (at 906). The manager also collects high-level policies from user via a user interface and other policy engines, and user feedback to aid and improve a learning algorithm (at 907).

From the set of input features and relevant input data, the present system and method uses two background processes to summarize (i.e., extract higher-layer information) and index the summarized data. The incremental process acts upon the reception of any new raw (i.e., un-summarized) feature data or any data update that causes previously indexed information to be immediately erroneous (e.g., a user changed IP address). This process runs a heuristic classification algorithm to summarize the raw features. The second process is a global process that runs periodically to update a learning model (e.g., re-training the classification algorithm), as well as re-summarize past data. Examples of the higher-layer information include, but are not limited to: Users; Applications; Protocols; Device; Content; Network and Physical Location (Telemetry); and Derived metadata, including: Learned relationships between the above (e.g., User X tend to access applications of type Y, tend to generate Z amount of traffic), Learned attributes of the above (e.g., rate of change vs. "stickiness" of the relationships), Learned behaviors about the above (e.g., this application appears to be having TCP issues, this user appears to be doing something malicious), and Learned changes in behavior of the above (e.g., this application has had an abnormally high set of errors, this application is using abnormally high bandwidth).

The summarization and indexing de-duplicates data. For example, if multiple collectors send the same data, the manager recognizes the duplication of data and disambiguates. In another example, if multiple collectors see the same information from the same enterprise system, the manager recognizes the duplicate information and disambiguates.

Figure 10:
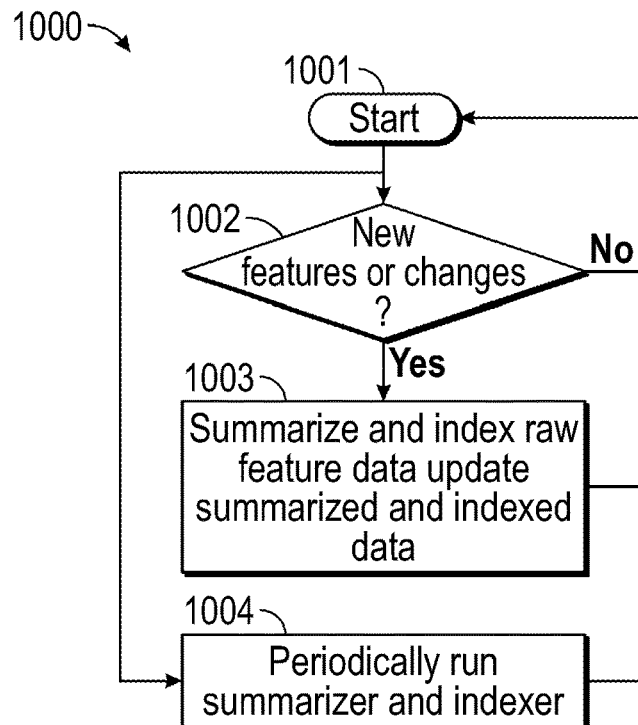
FIG. 10 is a flow diagram of summarization and indexing processes, according to one embodiment.

FIG. 10 is a flow diagram of summarization and indexing processes 1000, according to one embodiment. The summarization and indexing process starts (at 1001) and the manager determines whether a new feature is received or there is a change in network topology, statistics, and user information (at 1002). The manager runs an incremental algorithm to summarize and index any raw feature data, and runs a re-indexer to update previously summarized and indexed data with changes of user or topology information (at 1003). A combination of processes is used to compute a higher-layer binding. The manager periodically (e.g., once per day) runs a global re-summarizer and re-indexer (at 1004). For example, the collector performs a deep packet inspection (DPI) to identify unencrypted application traffic, and the identified application is sent as a feature. Alternatively, the machine learning at the manager based on characterizing applications by the flow or host features described earlier can be used for encrypted traffic. User information and device information can be gleaned by accessing other enterprise systems such as active directory, extracting key information from packets (e.g., user agent string, organizationally unique identifier (OUI)), or examining network-topology (e.g., wireless traffic comes from where the wireless access points are located).

Another example concerns detecting application behaviors. For example, the machine learning at the manager can identify the presence of certain packets (e.g., HTTP error packets) indicating certain types of errors. Similarly, a heuristic algorithm that takes into account the exact physical path the traffic takes can reveal other application behaviors. For example, packets are seen with increasing inter-arrival times as they pass through a particular switch; this indicates a congested or misconfigured switch. An example of the outputs of the heuristic algorithm is a probabilistically ranked list of higher-layer bindings.

According to one embodiment, training data is collected via a user's labelling of data. For example, a user, via a cloud portal, specifies that a particular user or application issue occurred recently. In another example, the present system and method suggests a set of possibilities for a given query. The user specifying which, if any, of those possibilities is the correct one is a useful training data. Further generalizing this, the present system and method combines algorithm insights from multiple networks to further enhance the classification of the collected data.

According to another embodiment, the present system and method performs, in real time, a segment-by-segment analysis of a particular user/application/device's traffic. To do this, the present system computes the physical and logical links that the traffic of interest is taking, and alters the tapping schedule of the collector(s) so that they collect data (e.g., packets, stats) pertaining to the physical links. Finally, the resultant features are indexed and analyzed in a similar vein to normally collected features.

Another example of summarization and indexing is computing composite metrics from the raw features and computing and storing comparisons of these metrics across different dimensions. For example, the present system and method computes a device quality-of-experience metric from raw measures of response times, packet loss, etc., and compares the value of that metric against devices of the same or different type (e.g., iPhones), those with the same or different operating system (e.g., Android), those connected to the same access point, etc. The computed, stored and indexed information can be quickly retrieved via a user interface query. It can also be used for a closed loop control with a programmable controller. The programmable controller controls network elements. The network manager controls the network elements via the programmable controller.

Cross-Network Learning

The manager located in the cloud has access to systems from multiple enterprises. For example, the present system is deployed as a multi-tenant system across customers. In such a deployment, no data is shared across customers, but the processes may be shared across customers.

An example of cross-network learning is to train separate classifiers for computing higher-layer bindings from the extracted features of separate customer networks. The separate classifiers can be combined to come up with an overall better classification (e.g., majority wins). Another example of cross-network learning is learning the most common queries across networks and dedicating a higher compute power to have a better answer for those particular queries.

Another example of cross-network learning is based on different system deployments that interact with each other. For example, the present system is deployed at a first customer network and a second customer network that send a lot of traffic to each other. The present system and method automatically detects the heavy traffic, and runs a more advanced performance testing algorithm directly between the collectors on both customer networks.

Another example of cross-network learning is for predicting higher-layer performance based on observed lower-layer characteristics of the network and applications. For example, suppose that on one network, the present system learned that high AP channel utilization results in a jitter resulting in poor real-time video application performance. The present system detects the presence of high AP channel utilizations to predict poor performance for another network that may or may not have yet deployed a real-time video application.

Query-Ability

According to one embodiment, the present system and method provides natural language query-ability of the network. The manager has a query box that takes natural language type input regarding the network and its users/applications/devices/behaviors. Examples of natural language queries are: "User X is having problem Y with application Z," "User X is experiencing slowness with salesforce.com," and "Tell me about the SAP application."

The present system and method responds to the queries and presents a probabilistically ranked list of answers, along with the probabilities/confidence for each answer. The present system and method also presents deeper supporting evidence if requested by the user.

The manager receives feature data from one or more collectors at various levels, for example, a flow level, host level, user level, and link level. The manager collects and indexes the collected data in terms of flow, host, user, link, and time intervals. As a flow of feature data arrives, the manager runs an incremental process to classify (a) an application that the flow corresponds to, (b) any interesting behaviors that the application underwent (e.g., failure to connect to a server, slow, errors), (c) a user involved in using the application, and (d) the devices involved in using the application. Additionally, the manager ties topology knowledge to an application (e.g., the location of an application server, network links that the application traffic traverses). This information is indexed along with each feature. The collector automatically runs performance tests on detected or configured application servers, for example, running ping tests to the application servers. The performance test results are also indexed along with the applications and features.

According to one embodiment, the present system and method provides a query interface (e.g., Internet interface) to a user. The user enters a query, for example, in a natural language form, into the user interface of the present system. For example, a user's query is "tell me about application X." The present system proceeds to perform the following steps: (1) Query the indexed database for (a) the location of the application (e.g., on-premise, in a cloud), (b) users who were using the application over the last few hours, (c) the behaviors of the application, (d) the bandwidth that the application was using. (2) Display the results of (1). (3) Compute the links that have carried the application traffic over the last day. Send a command to the collector to immediately collect a ten-second sample of all traffic on all of the links. Send commands to the programmable network element (e.g., via a controller) and forward the traffic from the links to the collector. (4) Augment the previously displayed results with those found in (3).

Another sample query may state, "user X is having problem Y with application Z" (i.e., tell me about it). The manager proceeds to perform the following steps: (1) Query the indexed database for flow instances where user X was using application Y. Of the behaviors recorded, rank-order the potential problem behaviors. Compare the corresponding features across links along network paths. Compare the features across time (i.e., historically). (2) Display (1). (3) Compute the links that have carried this user's application traffic over the last day. Send a command to the collector to immediately collect a ten-second sample of all traffic on all of these links. Send commands to the programmable network element (e.g., via a controller) to forward the traffic from those links to the collector. (4) Augment the previously displayed results with those found in (3).

Control

According to some embodiments, the present system and method involves using the visibility of the network and controlling the network. An example of controlling the network is enforcing a higher-layer policy throughout the network. Another example is automatic problem and security/anomaly/performance remediation where applicable. The present system and method may implement a network control in (a) a manual, or prescribed control, and (b) an automatic closed loop control. In both cases, one of the distinctions from the visibility perspective is that the binding of a higher-layer policy or a control objective needs to be tracked to the specific low-layer control primitives that the underlying network elements can be programmed with. Examples of the high-level control objectives include, but are not limited to: Block user X from accessing the network, Maintain high performance for Application Y, Detect and mitigate denial of service (DOS) attacks, and Prioritize user class Z traffic.

For a manual/prescribed control, the control instructions that achieve a high-level objective are computed and presented to the user, but not automatically programmed into the network elements. In addition, specific network elements that require a new or updated configuration based on the control instructions are computed as a function of network topology and presented to the user. The present system computes how the control is to be achieved in a distributed manner. The control instruction sets may be probabilistically ranked in the order of predicted effectiveness. While an explicit machine-to-machine programmability (e.g., controller) may not be required in some embodiments, it may be required for the present system to discover the configuration state and capabilities of the various network elements in other embodiments. The present system takes into account specific low-level control primitives that the network elements can be configured with. For example, many network elements have IP, MAC, and TCAM hardware tables of different sizes that are programmable with different primitives.

According to some embodiments, the disclosed system and method dynamically tracks the bindings between a user and the network (IP address, MAC address, physical port) as a user changes devices, plugs into a different sub-network, and receives a new IP address from a dynamic host configuration protocol (DHCP) server. According to some embodiments, the present system and method binds an application/network performance issue to specific traffic forwarding decisions (e.g., application slowness is caused by a set of particular source/destination IP address pairs that are highly utilizing a particular link) or a network configuration (e.g., a misconfigured maximum transmission unit (MTU)). According to some embodiments, the present system and method ties a particular anomalous traffic behavior to a specific user/application/device, and further to particular IP/MAC addresses.

According to some embodiments, the present system and method takes into account the topology and capabilities of the underlying network hardware. For example, if one is trying to use a pure layer 2 switch to enforce a user policy, it would be required to dynamically track the User→MAC address binding, and use only MAC addresses for programming rules into the switch. As an example of taking the topology into account, the present system and method tries to enforce a policy as close to the edge of the network as possible, which current firewalls, usually deployed inline at logical or physical network choke points, cannot do. The rules programmed to the network elements can be changed in a closed loop manner when the higher-layer to lower-layer bindings change.

Figure 11:
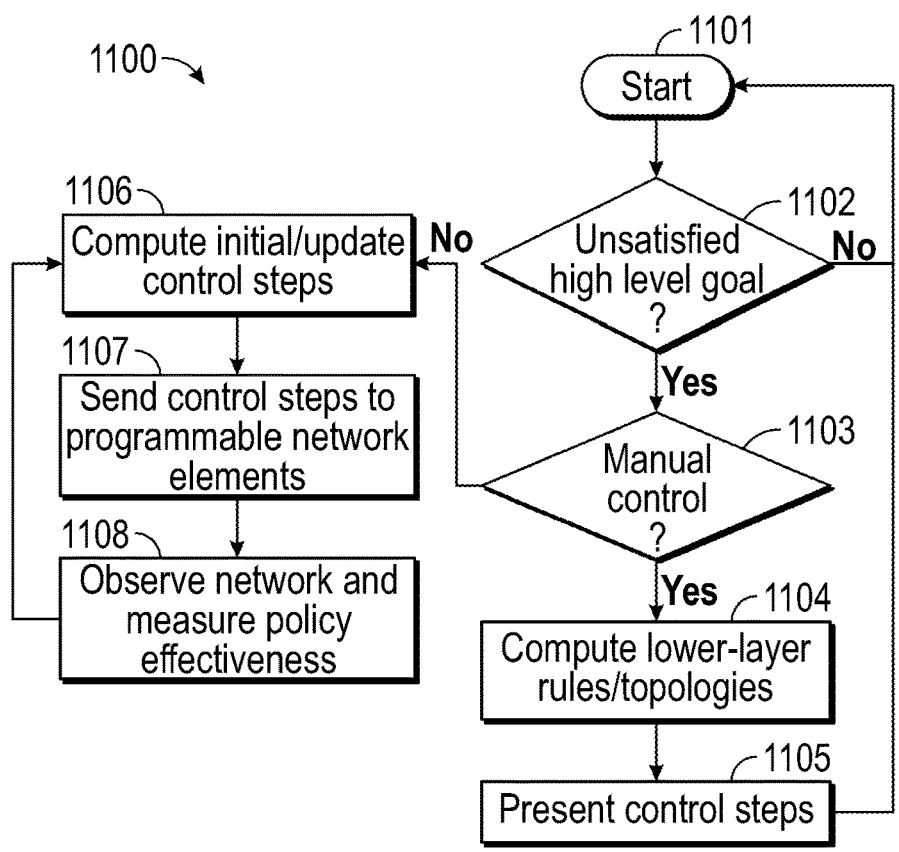
FIG. 11 is a flow diagram of a control loop, according to one embodiment.

FIG. 11 is a flow diagram of a control loop process 1100, according to one embodiment. The control loop starts (at 1101), and the manager determines whether there are unsatisfied high-level control objectives (at 1102). The manager branches off based on a control method (at 1103). For a manual control method, the manager computes the optimized lower-level rules and topologies to send to the network controller based on, but not limited to, 1) the high-level control objective, 2) estimated higher-layer bindings values and associated uncertainties, 3) configuration capability and current configuration of underlying network elements, and 4) other information such as network topology, statistics, tolerable configuration changes (at 1104). The manager presents the control method of specific network elements to achieve the high-level control objective to the user (at 1105). For an automatic control, the manager computes the initial update control to the programmable network elements based on, but not limited to, 1) the high-level policies, problems, security requirements, anomalies, 2) estimated higher-layer parameter values and associated uncertainties, 3) configuration capability and current configuration of underlying network elements, 4) other information such as network topology, statistics, tolerable configuration change, 5) measurement of effectiveness of the control policy, and 6) control loop parameters such as stability, oscillation, timescale (at 1106). The manager sends the control policy parameters to the programmable network elements (at 1107), and observes the network and measures effectiveness of the control policy with respect to the high-level policy (at 1108).

As an example of manual/prescribed control, the present system and method enforces a high-level objective of blocking user X from the network. To do this, the present system and method first derives the IP addresses that user X corresponds to. Then, the present system and method computes a logical choke point to apply the policy effectively. For example, the logical choke point corresponds to the routers on the subnets of user X's IP address. The output of the present system includes a set of commands at each of the routers that results in the traffic from/to those IP addresses being dropped. An alternative output is a set of commands to a controller to implement a desired control.

For an automatic control, the present system and method programs the network elements in a closed loop manner to achieve and maintain a high-level control objective. The automatic control is based on an inherent assumption that the underlying network has programmable network elements. In addition to the binding of higher-layer objectives to low-layer programmable primitives and taking into account the configuration state and capabilities of the underlying network elements, the present system and method computes a dynamic control loop. The present system and method first applies a possible control (e.g., a gain) and checks to see if a high-level objective is achieved. If so, the present system and method backs off the remediation and/or applies a different but lighter remediation and checks again to see if the high-level objective is still achieved. If not, the present system and method attempts to apply a heavier control and/or re-diagnose the higher-layer objective to low-layer control primitives binding and apply a different control. This procedure is also depicted in FIG. 11. The first step of the closed loop control may be different from the steps provided by the manual control. Additionally, factors such as stability, oscillation and timescale of response may be taken into account in the setup of the control loop.

The automatic closed loop control can be applied to the example of blocking user X from the network. In this example, the present system and method programs rules to drop traffic from/to user X's IP address(es) at the routers in the network. Assuming that works, the present system and method tries to program only user X's default gateway router with a rule. If it fails, the present system and method applies more rules to other routers and/or blocks certain ports and continues. When the user X comes in on a new IP address(es), the present system and method automatically adjusts to the changed network topology.

Another implementation of an automatic closed loop control is where the control objective is to maintain high performance for application X. In this case, the present system and method simply programs rules that place all traffic corresponding to that application into the highest performing queue. If improved application X performance is not observed, the present system and method attempts to program rules that re-route or rate-limit traffic from applications that share common network links with application X. If improvements are observed, the present system and method restores the performance of other applications.

An example of a higher-layer policy (for manual or automatic control) is "Prioritize traffic from employees using business applications such as Salesforce.com or Workday, over casual traffic such as traffic from guest users using a different set of applications." To implement this higher-layer policy, the present system and method dynamically tracks the session 5-tuples for these combinations, and computes a minimal set of rules necessary for the enforcement, and dynamically tracks and programs.

According to some embodiments, the present system and method automatically provides remedies to network problems. For example, a user enters in a query of the form "user X is having problem Y with application Z," and the present system and method provides the top-ranked answer (i.e., the answer with confidence greater than a certain threshold) that "there is congestion on common network links caused by users using application W." If automatic remediation is enabled for this particular query, the manager sends instructions to the collector to command the controller to tell the appropriate network elements to (a) prioritize user X→application Z traffic over other traffic, or (b) disallow traffic involving application W. The (b) remediation approach may require additional policy permission from the operator due to the restrictive nature of the traffic disallowing policy.

As an example of the remediation process, suppose that user X is "attached" to switch s3 and that application Z server is "attached" to switch s4. The policy to prioritize user X→application Z traffic may be applied by the controller that sends rules to switch s3 that matches user X's IP address (as source IP) and the application server IP address (as destination IP), and has an action that marks the IP diffsery code point (DSCP) bits to represent the highest class of service. Similarly, the reverse rule is applied to switch s4 (i.e., with the source and destination IP addresses flipped).

Alternatively, the rules may be applied to all switches along the communication path. These rules have similar match fields, but the action field directly sends the traffic to the highest priority queue. If the policy is to drop user X→application Z traffic, the rules are applied to the edge switches s3 and s4, respectively. This is a useful technique since the rules do not need to be applied everywhere in the network.

Another example of the automated remediation process is in the configuration domain. For example, for a query "there is a problem with application X," suppose that the top-ranked answer is "the problem appears to be that switch Y is dropping packets due to a misconfigured maximum transmission unit (MTU) value." The present system and method remediates this situation automatically by sending instructions to the collector to command the controller to reconfigure the MTU value of the appropriate switch.

According to some embodiments, one of the applications of turning visibility into control is a full-fledged distributed firewall. For example, the operator sets up a policy "user X cannot access application Y," or "user X may be barred from the network for Y minutes after Z failed logon attempts." In another example, the operator sets up a policy to isolate (e.g., on a quarantine VLAN®) a user whose traffic exhibits malicious or anomalous behavior. The detection and manual or automatic remediation of an anomaly (e.g., a detected DOS attack) can also be addressed within the control framework of the present system and method.

Figure 12:
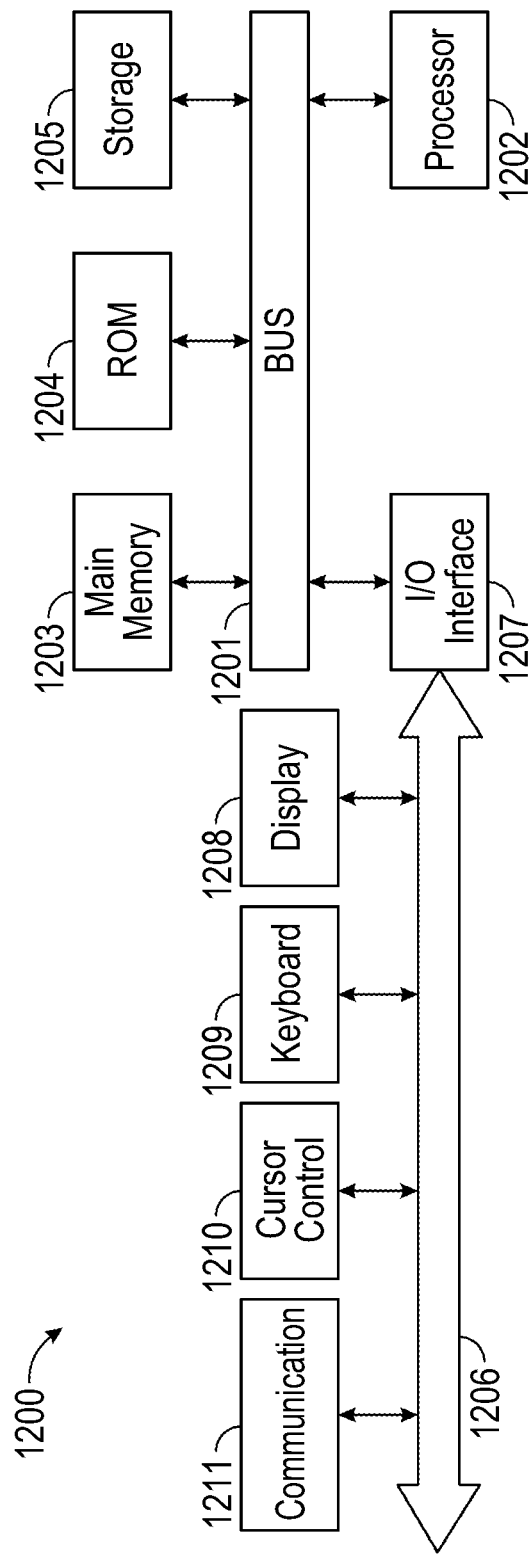
FIG. 12 illustrates exemplary computer architecture, according to one embodiment.

FIG. 12 illustrates an exemplary computer architecture that may be used for the present system, according to one embodiment. The exemplary computer architecture may be used for implementing one or more components described in the present disclosure including, but not limited to, the present system. One embodiment of architecture 1200 includes a system bus 1201 for communicating information, and a processor 1202 coupled to bus 1201 for processing information. Architecture 1200 further includes a random access memory (RAM) or other dynamic storage device 1203 (referred to herein as main memory), coupled to bus 1201 for storing information and instructions to be executed by processor 1202. Main memory 1203 also may be used for storing temporary variables or other intermediate information during execution of instructions by processor 1202. Architecture 1200 may also include a read-only memory (ROM) and/or other static storage device 1204 coupled to bus 1201 for storing static information and instructions used by processor 1202.

A data storage device 1205 such as a magnetic disk or optical disc and its corresponding drive may also be coupled to architecture 1200 for storing information and instructions. Architecture 1200 can also be coupled to a second I/O bus 1206 via an I/O interface 1207. A plurality of I/O devices may be coupled to I/O bus 1206, including a display device 1208, an input device (e.g., an alphanumeric input device 1209 and/or a cursor control device 1210).

Figure 13:
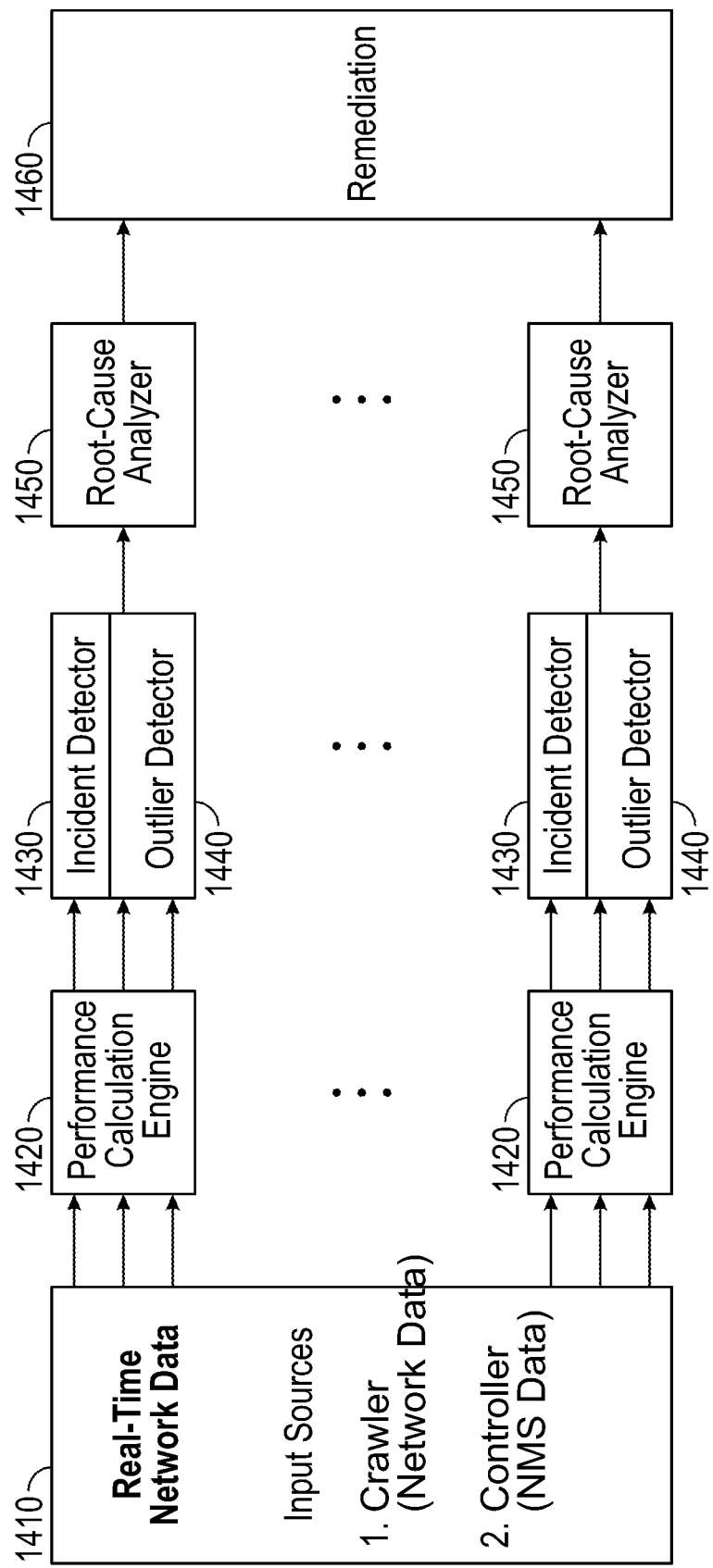
FIG. 13 illustrates a logic flow diagram of a client network incident identification, analysis, and remediation system and method for cross-company real-time network data analysis.
Figure 14:
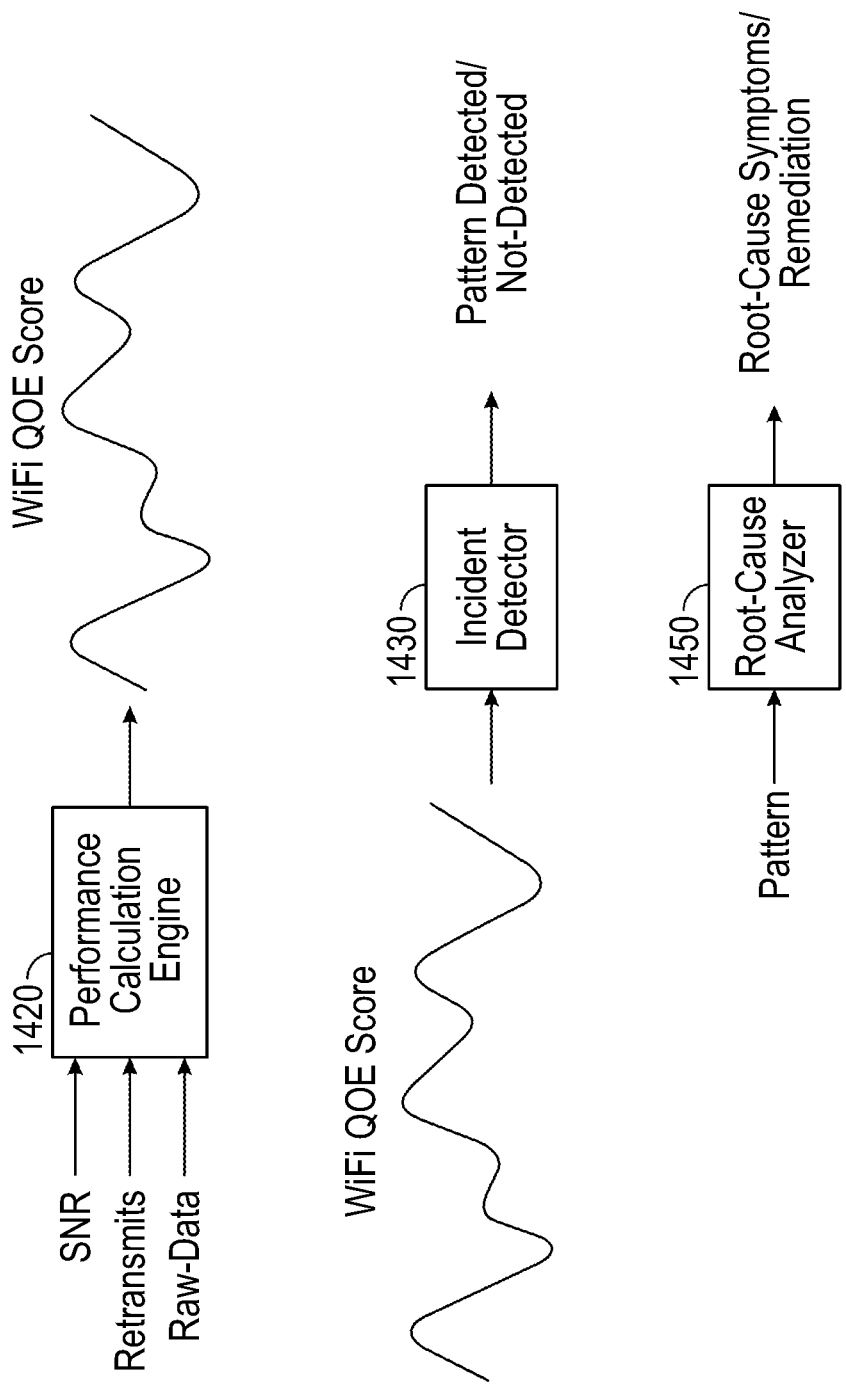
FIG. 14 illustrates a more detailed logic flow diagram of a client network incident identification, analysis, and remediation system and method for cross-company real-time network data analysis.

The communication device 1211 allows for access to other computers (e.g., servers or clients) via a network. The communication device 1211 may include one or more modems, network interface cards, wireless network interfaces or other interface devices, such as those used for coupling to Ethernet, token ring, or other types of networks. Identifying, Analyzing, and Remediating Network Incidents From Cross-Company Real-Time Network Data:

Referring now to FIGS. 13-14, the network incident identification and analysis system disclosed herein is directed towards: (1) receiving real-time network data (at 1410) and executing performance calculations (at 1420), (2) computing client and/or infrastructure incidents from the real-time network data (at 1430), (3) performing incident detection (at 1440), (4) finding and analyzing the root causes of the incident pattern (at 1450), and remediation options.

The network incident identification and analysis system examines multiple sources of real-time input network data, including: (1) metadata gleaned from deep packet analysis of real network traffic; (2) data from existing network elements, such as wireless controllers, access points, and the like; and (3) data from other on-premise systems, such as Microsoft Lync servers, and the like.

This combined real-time data is received into the network incident identification and analysis system, where the data is time-aligned, such that for every time T (for individual clients), there is a record of client data including: (1) Device/OS information; (2) Wireless metrics, such as SNR, packet loss/retransmits, connected Access Point, Channel Utilization at the AP, and the like; (3) L2-L4 information such as VLAN, receiver/transmitter bytes/packets, DSCP, TCP latency/retransmits, and the like; (4) Network services related L7 information such as DHCP, DNS, and RADIUS protocol info and response times; (5) L5-L7 information such as SSL Certificate, hostnames, HTTP response times; and (6) Application ID for detected applications such as Skype, SaaS applications, and the like.

In another aspect of the network incident system, the data is time-aligned, such that for every time T (for access points and wireless LAN controllers), there is a record of wireless information such as: (1) Detected noise and interference levels on each channel; (2) Information about neighboring APs and topology; (3) CPU/Memory utilization, reboots, and the like.

In some embodiments of the network incident identification and analysis system, where data is pulled from other on-premise systems, there could be additional client and/or infrastructure information for every time T, including: (1) UC systems (e.g., Microsoft Lync) call quality records including client MOS scores, jitter, packet loss, abnormal call terminations, and the like; (2) CPU/Memory utilization information from DHCP, DNS, RADIUS servers, as well as other network elements; and (3) Netflow/sflow/SNMP records from Routers, switches, and the like. NetFlow is a network protocol for collecting IP traffic information and monitoring network traffic to analyze flow data and create a picture of network traffic flow and volume. sFlow is a network traffic measurement system technology that is embedded in a network device and provides continuous statistics on any protocol (L2, L3, L4, and up to L7), thereby enabling traffic throughout a network to be accurately characterized.

Referring now to pattern analysis of individual network incidents, in the network incident identification and analysis system, a network incident is defined as a client, infrastructure network, or application issue that may occur in the environment. Examples of these kinds of issues, affecting an individual client or server or network element include: (1) "Client had poor Wi-Fi performance"; (2) "Client could not connect due to RADIUS issues"; (3) "Access point had more 5 GHz Capable Clients connecting on 2.4 GHz"; (4) "RADIUS server had outages"; (5) "DNS Infrastructure issues affected client"; (6) "Client have service interruptions due to excessive SSID transitions"; (7) "Client had poor Internet performance"; and (8) "Client did a TCP/UDP Port Scan."

Notably, when analyzing these network incidents, the network incidents often may be divided into "client type" incidents (i.e., incidents that involve the experience of a client), and "infrastructure type" incidents (i.e., incidents that involve the experience of an infrastructure element). Additionally, some network incidents may relate to a generic issue that is performance related (e.g., client could not connect to the network) or even security related (e.g., detected abnormal client behavior, such as a port scan).

For each of above described network incidences, the network incident identification and analysis system performs a mathematical analysis that involves inspecting for a pattern of parameters that persist over a period of time. In one example of a performance metric that persists over time, this type of incident may be detected by first evaluating a time series performance metric X(t) that would be evaluated on a "time instant by time instant" basis, based on other metrics present at that time instant. Next, the incident is detected over a longer period of time T as the condition of X(t) is less than some threshold q for a certain proportion of T. In one embodiment, the period of time is 10 minutes. In other embodiments, the period of time may be 1, 2, 5, 20, or 30 minutes.

In a first example, the network incident identified is that the "Client had poor Wi-Fi performance." In this scenario, X(t) represents Wi-Fi performance based on other metrics like SNR, L2 Retransmits/Packet loss, amount of data transmitted, etc. In a second example, the network incident identified is that the "Access point had more 5 GHz Capable Clients connecting on 2.4 GHz." In this scenario, X(t) reflects an indicator of the presence of the number of 5 GHz capable clients connecting to the 2.4 GHz Access Point Radio exceeding by Q percent, the number of 5 GHz capable clients connecting to the 5 GHz AP radio.

In another implementation, the network incident identification and analysis system also performs a mathematical analysis that involves inspecting for a pattern in a sequence of metrics/events that exhibit over time. This type of network incident may be detected by looking for a sequence of events {E} that manifest over a time T. In a first example, the network incident identified is that the "Clients have service interruptions due to excessive SSID transitions." In this scenario {E} would be the sequence of at least M "back and forth" SSID transitions for a particular client within a period of time T. In this example, in "incident occurrence at time t" is defined as a network incident that was detected over the time period between t-T→t.

Additionally, for any network incident there is a "group" version of the "individual" incident (which is described in greater detail below). The "group" version of an incident refers to the number of affected clients/infrastructure out of total number of clients/infrastructure. For example, "100 out of 1000 clients had poor Wi-Fi performance" would imply that out of 1000 clients that were using the Wi-Fi network, 100 of them had poor Wi-Fi performance.

Root cause analysis of individual network incidents, once a network incident is detected for an individual client or infrastructure element by the network incident system and a pattern has been determined, the root cause is then established by measuring a vector of "symptoms" that manifested at the same time instances as when the incident was occurring. These "symptoms" are specific relevant factors that explain causation of why that incident was occurring.

In one implementation, {K} is the set of time instances (out of the total period T) when the individual client or infrastructure element experienced the incident. Continuing in this implementation, {S} is the set of "symptoms" that are relevant to the particular incident in question. For each symptom s_i in {S}, the network incident identification and analysis system evaluates the correlation of s_i based on the percent of time instances K where the symptom manifested itself, as well as the corresponding values of the symptom at those instances. Additionally, {CS} is defined as the vector of correlation values for each symptom.

In the next portion of the root cause analysis, the {CS} vector is mapped to a set of potential root causes based on the value of the correlations first "thresholded," and then translated in a remediation database. An example of this process is provided below for a network incident in which the "Client X had poor Internet performance." In this example, the network incident identification and analysis system measures poor Internet performance by noting that HTTP response time was greater than "X" for over "Y" percent of the time "T" (e.g., see incident calculation).

The system tracks measured symptoms {S} during time instances {K} when the client was experiencing poor Internet performance:

(1) HTTP symptoms: HTTP response time greater than A, and the like.

(2) TCP symptoms: TCP latency greater than B, TCP retransmits greater than C, TCP window size less than D, and the like.

(3) DNS symptoms: DNS Latency greater than E, DNS drops greater than F, Unauthorized DNS Server used, and the like.

(4) Wi-Fi symptoms: SNR less than G, L2 packet loss/retransmits greater than H, Client roaming event, AP Noise greater than I, AP Channel Utilization greater than J, and the like.

In this scenario, an example root cause result identified by the network incident system is "poor Internet performance caused by Noise at Access Point." This root cause result was based on the factors (1) HTTP response time greater than A, (2) SNR less than G, and (3) AP Noise greater than I, which each manifested themselves over Z percent of the {K} bad time samples. Additionally, the amount that a symptom deviates from the normal/good value is also taken into account when deciding its contribution to a root cause result. In this manner, the set of potential root causes is aggregated and presented as the overall potential root causes for the specific Incident occurrence.

The previous sections described exemplary network incident identification and analysis systems, as well as network incident identification and analysis systems, which may be used to obtain the network incident data necessary to generate network incident graphs for the network incident remediation recommendation systems and methods to generate remediation recommendations.

Figure 15:
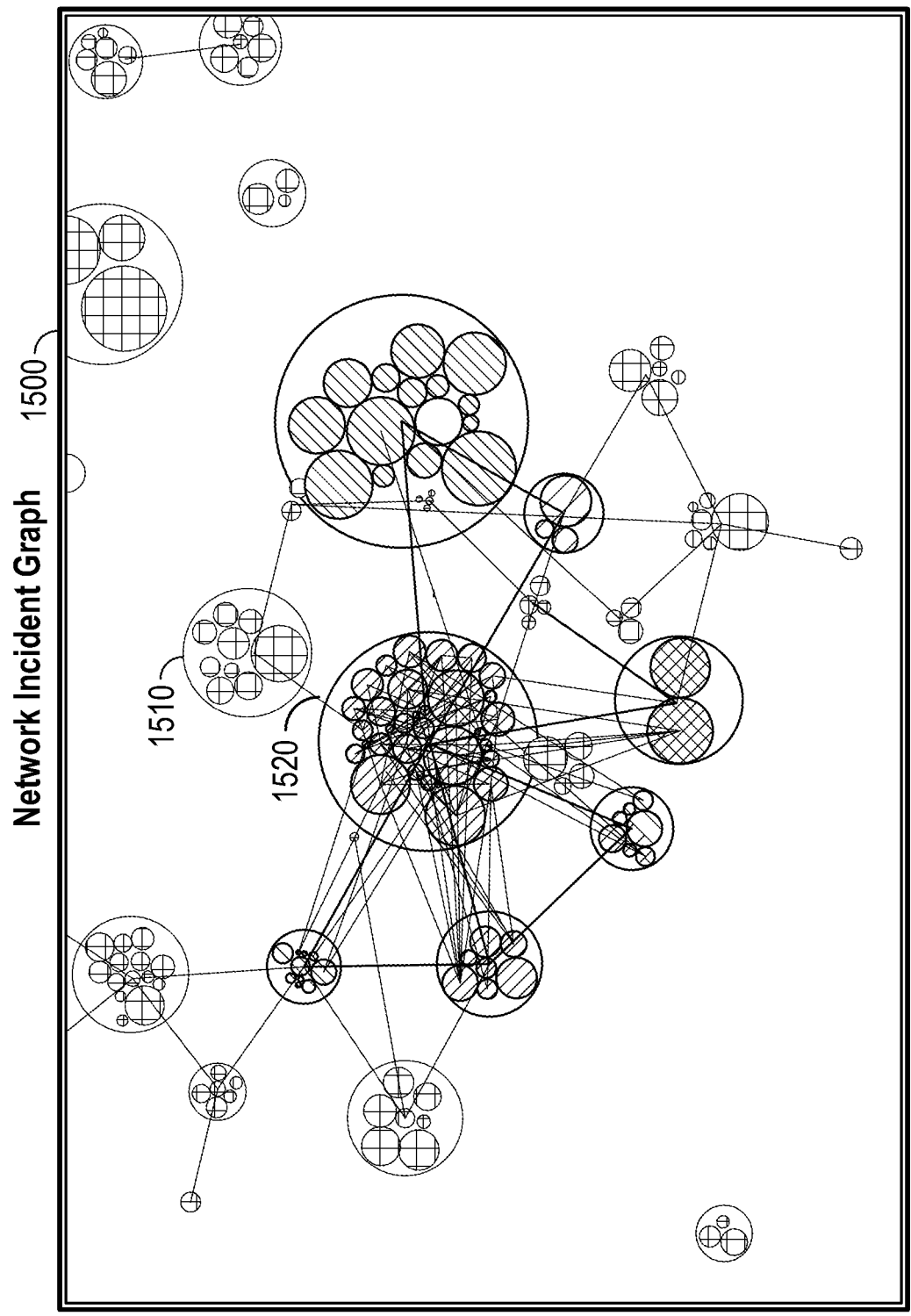
FIG. 15 illustrates a network incident graph in a system and method for network incident remediation recommendations.

Network Incident Remediation Recommendation Systems and Methods:

Referring now again to a system and method for network incident remediation recommendation, several elements that are involved in this type of system and method are described, including network incidents, root-cause symptoms, client hours, and network incident-graphs, as shown in FIG. 15. As described above, a network incident is a client, infrastructure, or an application issue that affects a subset of clients in the network. A network incident involves (1) a set of affected clients that are having a specific network related issue, and (2) a set of root-cause symptoms that are causing that issue for the affected clients. For every affected client that is part of a network incident, there are a set of symptoms that point to the possible root-cause of that issue. Thus, a network incident consists of a set of affected clients and a set of root-cause symptoms for each affected client.

An example of a network incident is "Clients had poor Wi-Fi performance from 10 am-11 am today." This is a network incident where a several clients had a specific network related issue of poor Wi-Fi performance. The root-cause symptoms that are causing the poor Wi-Fi performance may be bad SNR (signal-to-noise ratio), high packet retransmits, high co-channel interference, and/or combinations thereof. Another example of a network incident is "Clients could not connect to the network due to RADIUS issues from 9 am-10 am today." This is a network incident where several clients could not connect to the network due to RADIUS issues. A root-cause symptom causing the clients not to be able to connect to the network may be the result of authentication failures.

As described above, client incident hours (or client-hours for short) are the cumulative duration of a network issue over a certain time period, aggregated across all affected clients. Thus, for example, if a network incident has 100 affected clients over a two-hour duration, the total client-hours for that incident is 100*2=200. Similarly, for a group of 100 network incidents over a week, where each incident is over a three-hour duration and has 100 clients, the total client-hours of this network issue is 100*3*100=30,000.

The system and method for network incident remediation recommendation includes the generation and analysis of a network incident graph 1500. A network incident graph 1500 is a graph-based simulation that displays client-hours distribution of a particular network incident. Notably, the network incident graph 1500 displays network incident-related nodes 1510 and edges 1520. The nodes 1510 in the network incident graph 1500 are groupings of client-hour data and the edges 1520 in the network incident graph are the relationships between the groupings of client-hour data. Examples of network incidents that are used to generate network incident graphs 1500 are described below.

Figure 16:
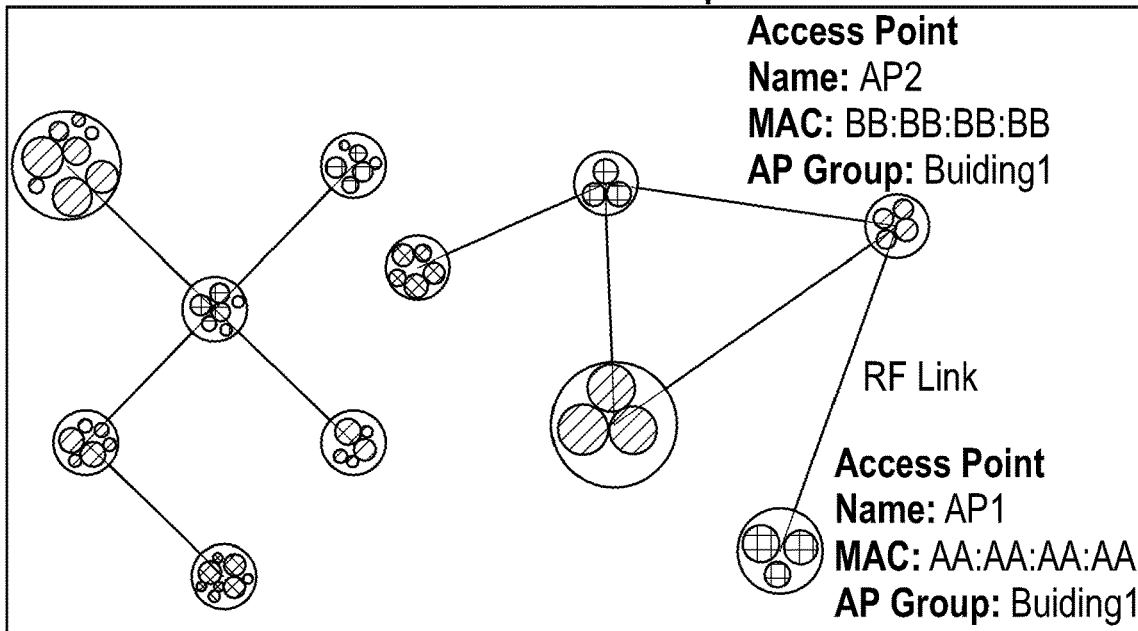
FIG. 16 illustrates a network incident graph for a Wi-Fi network layer in a system and method for network incident remediation recommendations.

Referring now to FIG. 16, in one example embodiment of the system and method for network incident remediation recommendation, the network incident is "Clients had poor Wi-Fi performance." In such an embodiment, data indicating this type of network incident is collected over a certain time period (e.g., a week). In an associated network incident graph, the nodes represent the access-points (AP) to which the client was connected when it was having a Wi-Fi network issue and the edges represent the Radio Frequency (RF) links between the APs. Notably, two APs have an RF link if they can hear each other's signal. In the system and method for network incident remediation recommendation, the network can compute the client-hour distribution by grouping individual client-hours across the various APs, and generate a Wi-Fi incidents graph where (1) individual nodes are the APs, (2) the size/weight of a node represents the cumulative amount of client-hours associated with that AP (i.e., the total number of client-hours when affected clients that were associated with that AP and were having Wi-Fi issues), and (3) the edges denote the RF neighborhood of the APs.

Figure 17:
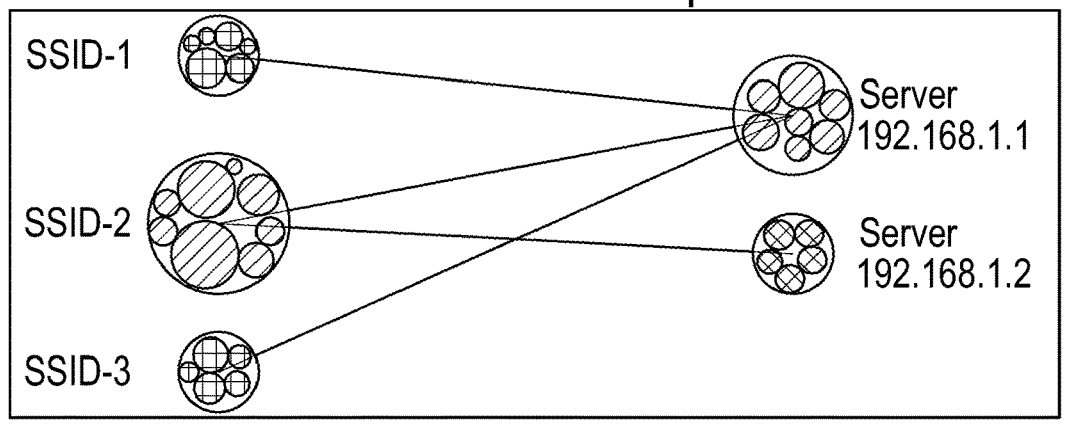
FIG. 17 illustrates a network incident graph for a RADIUS network layer in a system and method for network incident remediation recommendations.

Referring now to FIG. 17, in another example embodiment of the system and method for network incident remediation recommendation, the network incident is "Clients could not connect due to RADIUS issues." In such an embodiment, the associated network incident graph contains two sets of nodes. The first set of nodes represents the Service Set Identifiers (SSIDs) in the network, where the SSIDs are Wi-Fi network identifiers. The second set of nodes represents the RADIUS servers in the network. Continuing in this embodiment, the edges are drawn between the SSID nodes and the server nodes. The edges represent that RADIUS protocol messages for a client on a particular SSID were sent to the corresponding RADIUS server. Otherwise stated, an edge between a SSID node and a server node shows that clients on that SSID exchanged RADIUS protocol messages with the corresponding server. Accordingly, the system and method for network incident remediation recommendation can now compute the client-hour distribution of network incidents on this network incident graph by grouping individual client-hours across SSIDs and RADIUS server nodes.

In at least one embodiment of the system and method for network incident remediation recommendation, the steps to construct a network incident graph are described below. First, the nodes and edges are identified for the network incident graph. Example embodiments of graph representations for the various network layers include, by way of example only, and not by way of limitation: Wi-Fi, RADIUS, DHCP, and DNS. Notably, other types of graph representations for the various network layers may be used as well.

Referring again to FIG. 16, in an embodiment in which the graph representation is for Wi-Fi as a network layer, the network incident graph defines APs as nodes. Additionally, in this embodiment, the edges represent the presence of an RF link between the APs. In another instantiation of this network incident graph, the AP-groups are defined as nodes. For example, a network incident graph for Wi-Fi as a network layer displays either a particular RF band (e.g., 2.4 GHz or 5 GHz), or both RF bands combined. Each node in the graph is an Access Point. An edge is drawn between two nodes in the graph if the access point radios on the respective RF band can hear each other's wireless signal. In one embodiment, if the graph represents a 2.4 GHz band graph, two nodes have an edge if the 2.4 GHz radio on respective access points can hear each other's wireless signal. If the graph is a combined band graph, two nodes have an edge if either the 2.4 GHz radio or the 5 GHz radio on the respective access points can hear each other's wireless signal. The circle size on the graph denotes the number of client-hours associated with that access point.

Variations on the above network incident graph are also possible. In one variation, the nodes in the graph are clustered together by an AP-group or any kind of custom grouping to which the access point belongs. In another variation, the size of the circle denotes metrics other than number of client-hours, such as the total amount of traffic on a particular AP. In still another variation, the size of the circle denotes the total amount of traffic for a particular application on the respective access point.

Referring now to FIG. 17, in another embodiment in which the graph representation is for RADIUS servers as a network layer, the network incident graph defines two sets of nodes, one set being the SSIDs in the network and the other set being the RADIUS servers. Additionally, in this embodiment, an edge exists between a SSID node and a server node if clients on that SSID exchanged RADIUS protocol messages with that corresponding server.

In one embodiment, the size of each node circle in the network incident graph denotes the number of client-hours of RADIUS authentication issues associated with the respective SSID or the server. In another aspect of such an embodiment, the thickness of the edge denotes the number of client transactions that happen between the respective SSID and the server.

Variations on the above network incident graph are also possible. In one variation, the RADIUS server network incident graph may have more than two layers of nodes if there are several layers of servers load balancing client transactions. In another variation, the size of the circle may instead denote the number of client transactions associated with that respective node.

Figure 18:
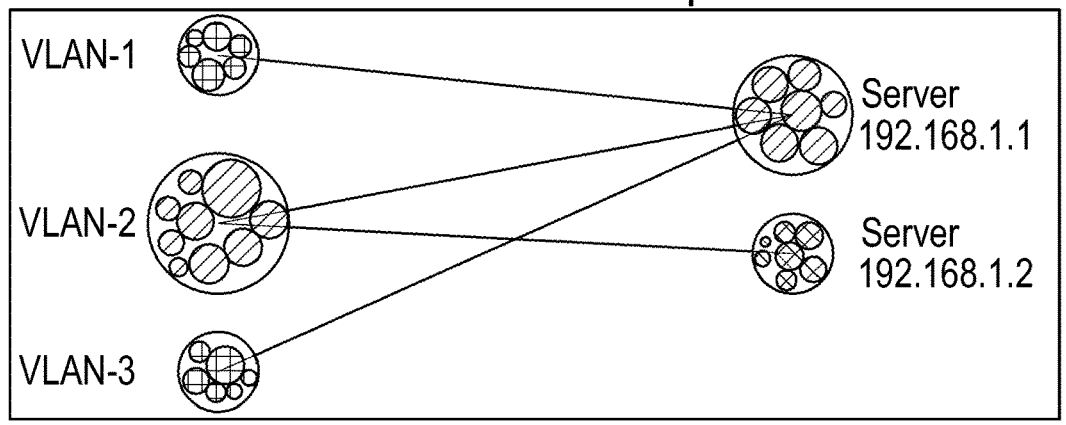
FIG. 18 illustrates a network incident graph for a DHCP/DNS network layer in a system and method for network incident remediation recommendations.

Referring now to FIG. 18, in still another embodiment in which the graph representation is for DHCP servers as a network layer, the network incident graph defines two sets of nodes, one set being the VLANs in the network and the other set being the DHCP servers. Additionally, in this embodiment, an edge exists between a VLAN node and a server node if clients on that VLAN exchanged DHCP protocol messages with that corresponding server.

In one embodiment, the size of the circle denotes the number of client-hours of DHCP issues associated with the respective VLAN or the server. In another aspect of such an embodiment, the thickness of the edge denotes the number of client transactions that happen between the respective VLAN and the server.

Variations on the above network incident graph are also possible. In one variation, the DHCP server network incident graph may have more than two layers of nodes if there are several layers of servers load balancing client transactions. In another variation, the size of the circle may instead denote the number of client transactions associated with that respective node.

Referring still to FIG. 18, in yet another embodiment in which the graph representation is for DNS servers as a network layer, the network incident graph defines two sets of nodes, one set being the VLANs in the network and the other set being the DNS servers. Additionally, in this embodiment, an edge exists between a VLAN node and a server node if clients on that VLAN exchanged protocol messages with that corresponding server.

In one embodiment, the size of the circle denotes the number of client-hours of DHCP issues associated with the respective VLAN or the server. In another aspect of such an embodiment, the thickness of the edge denotes the number of client transactions that happen between the respective VLAN and the server.

Variations on the above network incident graph are also possible. In one variation, the DNS server network incident graph may have more than two layers of nodes if there are several layers of servers load balancing client transactions. In another variation, the size of the circle may instead denote the number of client transactions associated with that respective node.

Referring again to FIG. 18, in yet another embodiment in which the graph representation is for ARP servers as a network layer, the network incident graph defines two sets of nodes, one set being the VLANs in the network and the other set being the ARP servers. Additionally, in this embodiment, an edge exists between a VLAN node and a server node if clients on that VLAN exchanged ARP protocol messages with that corresponding server.

In one embodiment, the size of the circle denotes the number of client-hours of ARP issues associated with the respective VLAN or the server. In another aspect of such an embodiment, the thickness of the edge denotes the number of client transactions that happen between the respective VLAN and the server.

Variations on the above network incident graph are also possible. In one variation, the ARP server network incident graph may have more than two layers of nodes if there are several layers of servers load balancing client transactions. In another variation, the size of the circle may instead denote the number of client transactions associated with that respective node.

In the embodiments of the system and method for network incident remediation recommendation described above, the next step to construct a network incident graph is to compute the client-hour distribution across the nodes of the graph and assign the weight of the node as the corresponding aggregated value of client-hours. The weight of the node is the size of the node as displayed on the network incident graph image.

Figure 19:
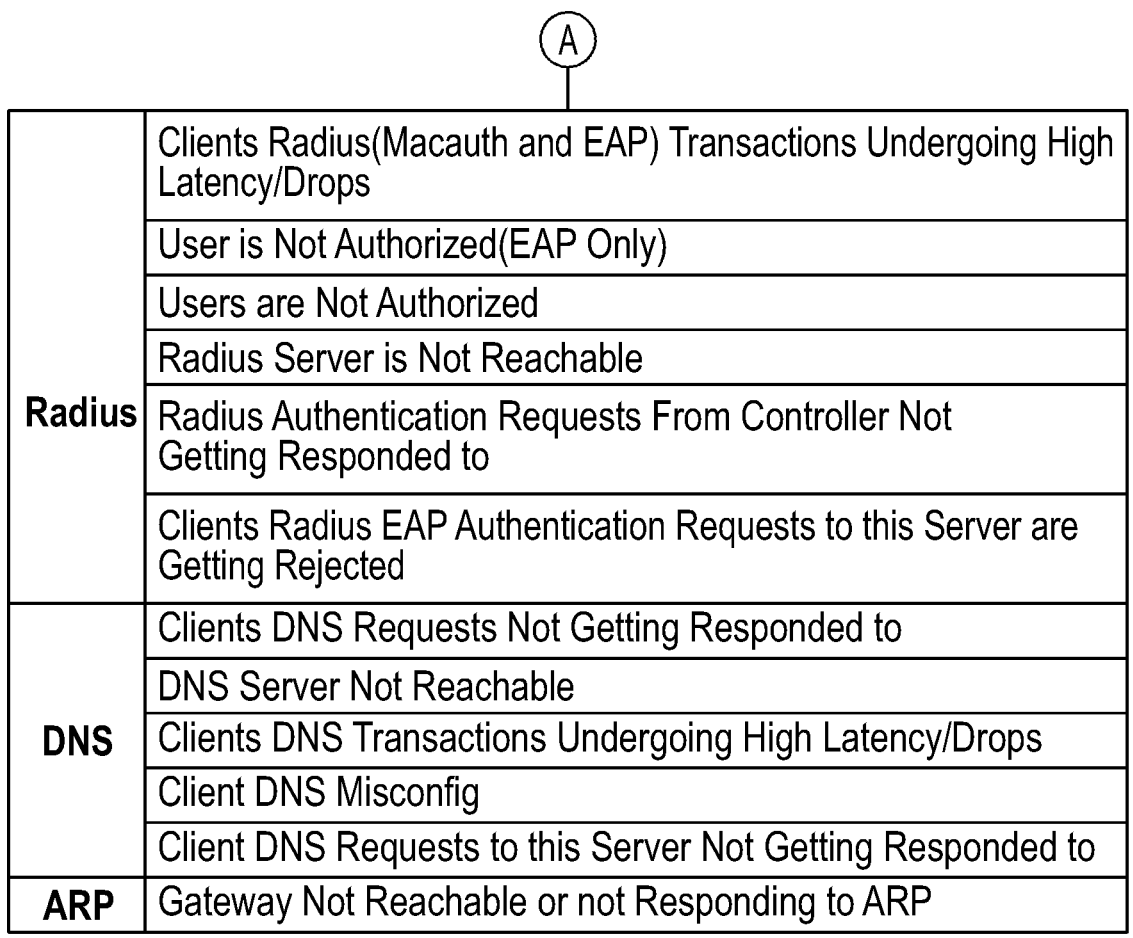
FIG. 19 illustrates a list of action items that may be taken to mitigate future network incidents and reduce user productivity loss.

The system and method for network incident remediation recommendation generates a list of action items (shown in FIG. 19) that a user, a network engineer, or the system itself (depending on the action item) can take to mitigate future network incidents and reduce user productivity loss. The list of remediation recommendation action items in FIG. 19 is presented by way of example only, and not by way of limitation. In some embodiments, the system and method for network incident remediation recommendation analyzes network data to find systemic issues in the network. Examples of such systemic issues in the network include, by way of example only, and not by way of limitation: network device misconfigurations (e.g., switch or router misconfiguration), network design issues (e.g., sub-optimal Wi-Fi deployment), poor AP placement, insufficient network bandwidth, and the like.

The method for network incident remediation recommendation includes the following steps that are involved in generating a list of remediation recommendations. In some embodiments, the list of remediation recommendations are ranked and prioritized by associated client-hours, actionability, or the like, as will be further explained below.

In the first step in at least one embodiment of the method for network incident remediation recommendation, network data is received and analyzed with respect to network incidents. In this step, the system uses a stream of network data as input to generate a register of network incidents. An example of a network incident is "Clients had poor Wi-Fi performance between 10 am-11 am." This denotes a Wi-Fi network incident in which a set of clients had poor wireless performance in that time period. Each client then contributes 1 client-hour to that incident. The cumulative number of clients denotes the total number of client-hours that may be attributed to that incident.

In the second step in at least one embodiment of the method for network incident remediation recommendation, client-hours are aggregated across a collection of network incidents. In this manner, the system collects all the network incidents that are related to a particular network issue over a fixed time period. The fixed time period is typically longer than the one hour mentioned in the first step. The fixed time period may be, for example, one week. The system then computes the aggregated client-hours by grouping the network incident data across various groups and across various root-cause symptoms. In some embodiments, the groups over which client-hours may be aggregated are APs, AP-groups, VLANs, SSIDs, servers, and the like.

In the third step in at least one embodiment of the method for network incident remediation recommendation, the network incident graph is generated. A network incident graph is computed by superimposing the client-hours distributions of the groups of network incidents over a network graph. As explained above, the nodes in this network incident graph may either represent physical network entities or logical network groupings. The edges in this network incident graph denote the relationship between the physical network entities or logical network groupings. The weights of the nodes represent the cumulative client-hours associated with that node. The weights of the nodes are graphically depicted by the size of the node.

In the fourth step in at least one embodiment of the method for network incident remediation recommendation, the network incident graph is analyzed to identify network issues, such as systemic network issues. The network incident graph is analyzed to identify localized areas with systemic issues. In one example embodiment, the analysis of the network incident graph by the system includes identifying connected components of the graph that have a significant amount of client-hours associated therein. In another example embodiment, the analysis of the network incident graph by the system includes using a highest weighted node algorithm to identify structures in the network incident graph. In still another example embodiment, the analysis of the network incident graph by the system includes using a most connected node algorithm to identify structures in the network incident graph. In another example embodiment, the analysis of the network incident graph by the system includes using a node cluster with highest density algorithm to identify structures in the network incident graph. In one example embodiment that relates to Wi-Fi recommendations, if APs X, Y, Z form a cluster on the network incident graph, then one instance of the graph analysis algorithm may identify this cluster as a localized area for the generating the remediation recommendation.

In the fifth step in at least one embodiment of the method for network incident remediation recommendation, the system generates remediation recommendations. Based on the graphical analysis in the previous step, the method for network incident remediation recommendation generates a list of remediation recommendations. In at least one embodiment, each remediation recommendation identifies a systemic issue in the network and a possible remediation action that may be taken to resolve the issue. In some embodiments, this list of remediation recommendations is ranked, sorted, and/or prioritized based on one or more various factors. For example, in at least one embodiment of the system and method for network incident remediation recommendation, the list is prioritized based on total number of client-hours associated with that grouping of network incidents. Specifically, the total number of client-hours quantifies the size of the benefit obtained from applying that recommendation. In at least one other embodiment of the system and method for network incident remediation recommendation, the list is prioritized based on actionability. In this context, actionability represents how quickly a particular remediation can be applied. Accordingly, recommendations that may be made by sending a set of commands would be prioritized above recommendations that required a software update. In turn, recommendations that required a software update would be prioritized above recommendations that required a physical configuration change to network devices and/or systems.

Figure 20:
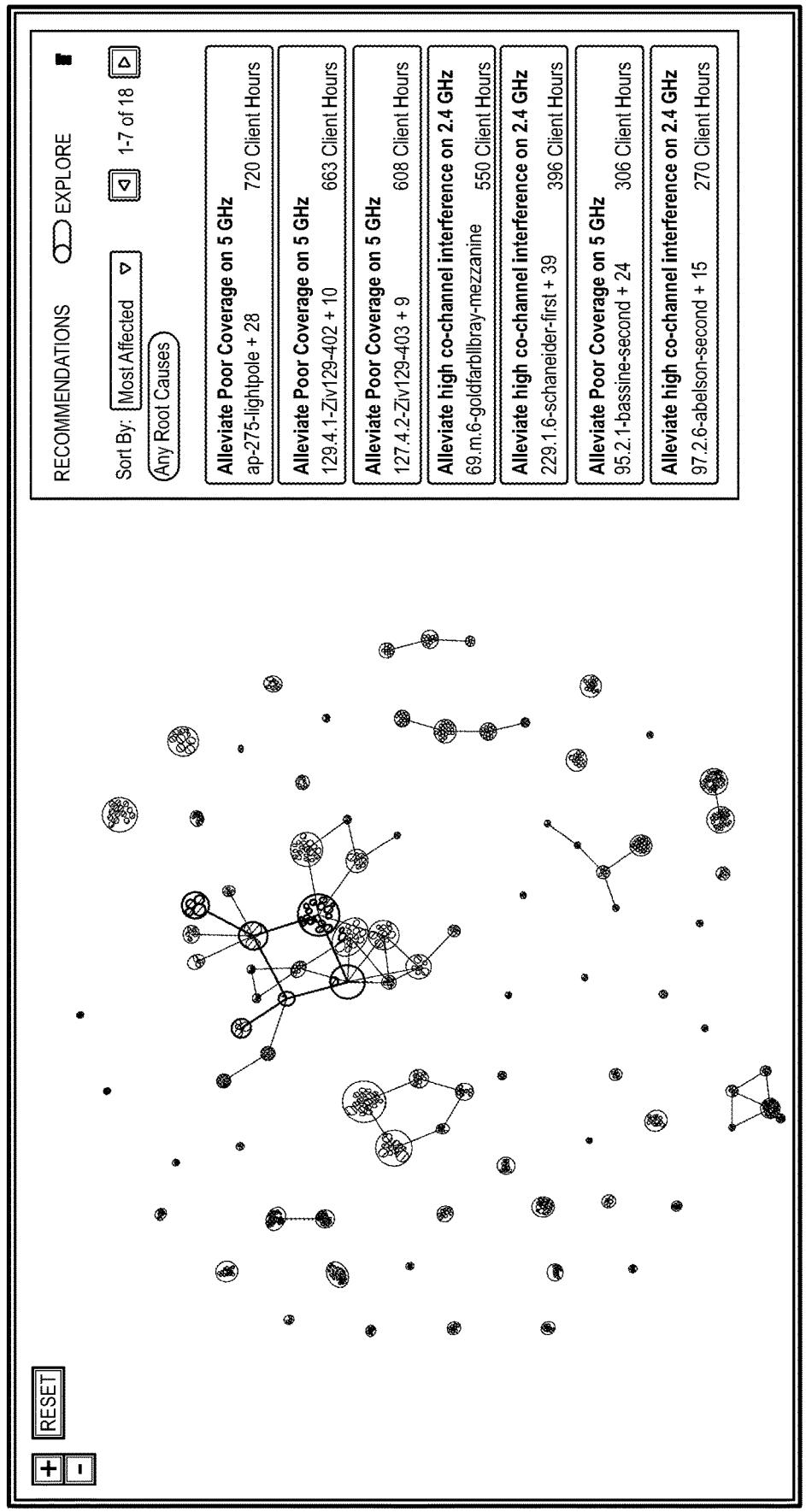
FIG. 20 illustrates a network incident graph and remediation recommendation interface in a system and method for network incident remediation recommendations for a first recommendation.

One example of a remediation recommendation generated by the network incident remediation recommendation system is shown in FIG. 20. This remediation recommendation is to alleviate a poor coverage issue near the AP-275-lightpole area. The benefit provided by implementing this remediation recommendation is regaining 720 client hours that were lost due to poor experience.

Figure 21:
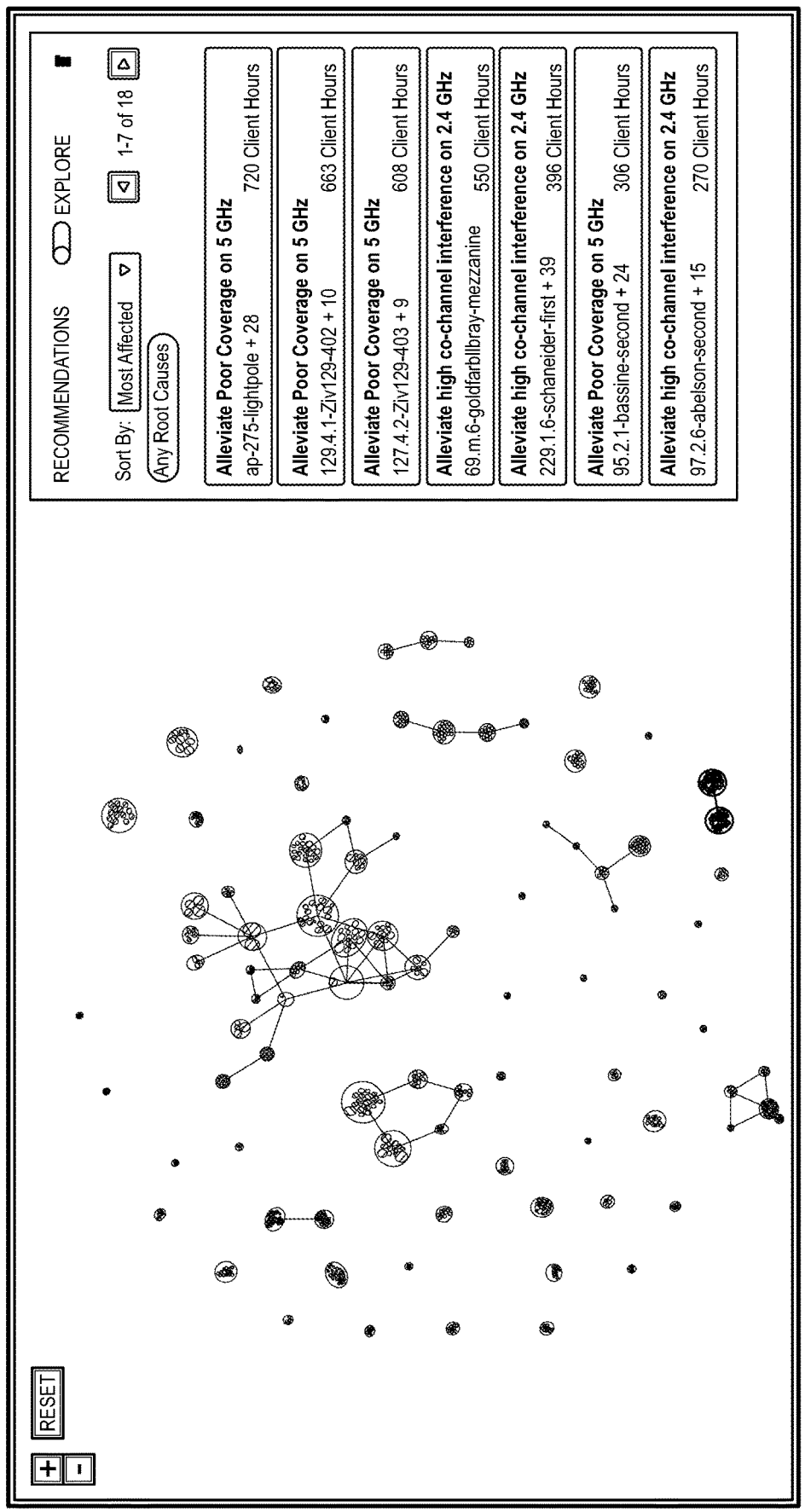
FIG. 21 illustrates the network incident graph and the remediation recommendation interface in a system and method for network incident remediation recommendations for a second recommendation.

Another example of a remediation recommendation generated by the network incident remediation recommendation system is shown in FIG. 21. This remediation recommendation is to alleviate high co-channel interference among APs surrounding the 229.1.6-schneider-first AP. The benefit provided by implementing this remediation recommendation is regaining 396 client hours that were lost due to poor Wi-Fi experience.

Still another example of a remediation recommendation generated by the network incident remediation recommendation system addresses DHCP timeouts. This remediation recommendation is to mitigate DHCP timeouts on VLANs 300 and 400. The benefit provided by implementing this remediation recommendation is regaining 800 client hours of poor experience caused by DHCP connectivity issues.

In the system and method for network incident remediation recommendation, various aspects of the systems, methods, functions, steps, features, and the like corresponding thereto may be implemented on one or more computer systems using hardware, software, firmware, circuits, or combinations thereof. Hardware, software, firmware, and circuits respectively refer to any hardware, software, firmware, or circuit component. Computer systems referred to herein may refer to any computing device and vice versa (e.g., smart phone, mobile computing device, personal data assistant, tablet computer, laptop computer, desktop computer, other computing device, and the like). For example, each computer system or computing device in the systems described herein or any embodiment of a system disclosed herein may utilize one or more of the following components: a single-core or multi-core hardware processor (e.g., central processing unit or graphics processing unit) on which software instructions are executed (e.g., instructions corresponding to an operating system, an application program, an interpreter such as a virtual machine, or a compiler); a memory associated with and in connection with the hardware processor such as cache or other system memory that stores software instructions or other data that the hardware processor may access for processing; an input device (e.g., mouse, keyboard, touchscreen, and the like); an output device (e.g., display, touchscreen, printer, and the like); a network or communication interface that enables the computer system to communicate over a network or communication protocol; and/or an application program having corresponding software instructions that are executable by a hardware processor. Connections between different computer systems and connections between different computer system components may be wired or wireless.

In some embodiments of the system and method for network incident remediation recommendation, virtualization computing techniques, cloud computing techniques, web application/website computing techniques, traditional and adaptive streaming techniques, and other computing techniques may be implemented by any embodiment of a system disclosed herein to enable and/or enhance the teachings described herein. For example, in a cloud computing embodiment, one or more servers (i.e., one or more computer systems) may store and execute software instructions corresponding to an application program based on input data received from client devices. In response to the input data received, the application program is executed accordingly, which results in graphical data being processed and output to the client devices for display on a display such as a touch screen on a smart phone or tablet computer.

As another example, in a web application or website embodiment, data representative of a user input may be transmitted to a server (i.e., a computer system) hosting the website for processing and storage in memory. In an application program embodiment, the application may be stored and executed locally on a user's computer system. In other embodiments, one or more components of the application program may be stored and executed on a server and the user's computer system. For example, a user may download the application program from an app store for an Android computing device, Apple computing device, Windows computing device, Samsung computing device, other computing device, and the like. Execution of the application program on the user's computing device may require that the device transmit and receive data to and from one or more computing devices such as a server or other user's computing device. For example, an application may be downloaded from a server to a mobile device. Upon installation, the mobile device may communicate with a server. Additionally or alternatively, the embodiments of the system and method for network incident remediation recommendation may execute server-based applications over a network (e.g., the Internet), locally-based "thick client" versions of the application, downloadable and installable versions of the application, or combinations thereof.

One or more embodiments of the system and method for network incident remediation recommendation may utilize streaming technology. Streaming data enables data to be presented to the user of the client device while the client device receives data from the server. Streaming data from servers to client devices (e.g., computing devices operated by users) over a network is typically limited by the bandwidth of the network, or alternatively, the physical layer net bitrate. Traditional streaming protocols, such as RTSP (Real-Time Streaming Protocol), MS-WMSP (Windows Media HTTP Streaming Protocol), and RTMP (Real-Time Messaging Protocol) may be implemented, which essentially send data in small packets from the server to the client device in real-time at the encoded bitrate of the data. Adaptive streaming may also be implemented. Similar to traditional streaming, data is encoded into discrete packets of a particular size; however, the source data is encoded at multiple bitrates rather than a single bitrate. The data packets corresponding to the same data encoded at different bitrates are then indexed based on the bitrate in memory. This streaming method works by measuring, in real-time, the available bandwidth and computer capacity of the client device, and adjusts which indexed data packet to transfer based on the encoded bitrate.

One or more aspects of the system and method for network incident remediation recommendation may be located on (i.e., processed, stored, executed, or the like; or include one or more hardware or software components) a single computer system or may be distributed among a plurality of computer systems attached by one or more communication networks (e.g., internet, intranet, a telecommunications network, and the like). One or more components of a computer system may be distributed across one or more computer systems in communication with the computer system over a communication network. For example, in some embodiments, the systems disclosed herein may utilize one or more servers (i.e., one or more computer systems dedicated for a particular purpose in the system) that may be dedicated to serve the needs of one or more other computer systems or components across a communication network and/or system bus. The one or more servers may provide a central processing location for one or more aspects of the systems disclosed herein.

Those of ordinary skill in the art will appreciate that one or more circuits and/or software may be used to implement the system and method for network incident remediation recommendation. Circuits refer to any circuit, whether integrated or external to a processing unit such as a hardware processor. Software refers to code or instructions executable by a computing device using any hardware component such as a processor to achieve the desired result. This software may be stored locally on a processing unit or stored remotely and accessed over a communication network.

As disclosed herein in the system and method for network incident remediation recommendation, the phrase "executed by a computing device" includes execution by any hardware component (e.g., CPU, GPU, network interface, integrated circuits, other hardware components, and the like) of the computing device such as a hardware processor. Any module may be executed by a computing device (e.g., by a processor of the computing device). Any method, function, step, feature, result, and the like disclosed herein may be implemented by one or more software modules whether explicitly described or not. Individual components within a computing device may work together to accomplish a desired method, function, step, feature, or result. For example, a computing device may receive data and process the data. A simple example would be a network interface that receives the data and transmits the data over a bus to a processor.

Certain words and phrases used in the system and method for network incident remediation recommendation are set forth as follows. As used throughout this document, including the claims, the singular form "a", "an," and "the" include plural references unless indicated otherwise. Any of the features and elements described herein may be singular, e.g., a sensor may refer to one sensor and a memory may refer to one memory. The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation, such a device may be implemented in hardware, firmware, or software, or some combination of at least two of the same. The functionality associated with any particular controller may be centralized or distributed, whether locally or remotely. Other definitions of certain words and phrases are provided throughout this patent document. Those of ordinary skill in the art will understand that in many, if not most instances, such definitions apply to prior as well as future uses of such defined words and phrases.

A processor (i.e., a processing unit), as used in the system and method for network incident remediation recommendation, refers to one or more processing units individually, shared, or in a group, having one or more processing cores (e.g., execution units), including central processing units (CPUs), digital signal processors (DSPs), microprocessors, micro controllers, state machines, and the like that execute instructions. The processors interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, embodiments describe software executable by the processor and operable to execute certain ones of the method acts. As disclosed herein, a processor may refer to any hardware processor or software processor. A software processor may include or otherwise constitute an interpreter that is executed by a corresponding hardware processor. A computer system according to any embodiment disclosed herein is configured to perform any of the described functions related to the various embodiments of the systems disclosed herein.

In the system and method for network incident remediation recommendation, memory may be used in a variety of configurations. As known by one skilled in the art, each memory comprises any combination of volatile and non-volatile, transitory and non-transitory computer-readable media for reading and writing. Volatile computer-readable media includes, for example, random access memory (RAM). Non-volatile computer-readable media includes, for example, read only memory (ROM), magnetic media such as a hard-disk, an optical disk drive, a flash memory device, a CD-ROM, and/or the like. In some cases, a particular memory is separated virtually or physically into separate areas, such as a first memory, a second memory, a third memory, and the like. In these cases, it is understood that the different divisions of memory may be in different devices or embodied in a single memory. The memory may be configured to store data.

In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

As described herein in the system and method for network incident remediation recommendation, where a range of values is provided, it is understood that each intervening value, to the tenth of the unit of the lower limit unless the context clearly dictates otherwise, between the upper and lower limit of that range and any other stated or intervening value in that stated range, is encompassed within the invention. Also encompassed within the invention, the upper and lower limits of these smaller ranges may be independently included in the smaller ranges, subject to any specifically excluded limit in the stated range. Where the stated range includes one or both of the limits, ranges excluding either or both of those included limits are also included in the invention.

Throughout the specification, claims, and drawings of the system and method for network incident remediation recommendation, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the breadth and scope of a disclosed embodiment should not be limited by any of the above-described exemplary embodiments, but should be defined only in accordance with the following claims and their equivalents.

What is claimed is:

1. A method for identifying network incidents and providing remediation recommendations for the network incidents, the method comprising:
    analyzing a stream of network data that is captured over a time period, in order to identify a plurality of incidents within the network over the time period, each network incident relating to an issue and having a set of symptoms that is associated with a set of possible root-causes; and
    identifying a plurality of groups of network incidents with the network incidents in each group related to the same issue; and
    analyzing the grouped network incidents to identify, and to provide a display of, a list of remediation recommendations that includes a remediation recommendation for each group of incidents, each group's remediation recommendation identifying a remediation to resolve the issue related to the group and a quantified expected benefit from implementing the remediation.

2. The method of claim 1, wherein each group's remediation recommendation further identifies at least one root cause for the network incidents in the group.

3. The method of claim 1, wherein identifying the plurality of groups comprises grouping the network incidents that relate to the same issue.

4. The method of claim 1, wherein network incidents are associated with client incident hours, the method further comprising computing for each group an aggregate client incident hour based on the client incident hours of each network incident in the group, wherein analyzing the grouped network incidents comprises generating a sorted order of the groups based on the aggregate client incident hours of the groups.

5. The method of claim 4, wherein:
    generating the sorted order comprises generating a sorted order that lists the groups from highest to lowest aggregated incident hours; and
    providing the display of the list of remediation recommendations comprises providing a display of a subset of N groups of network incidents that have the highest aggregate incident hours, N being an integer.

6. The method of claim 1, wherein a network incident is a client, infrastructure, or application incident that negatively affects a subset of elements in the network.

7. The method of claim 1, wherein the quantified expected benefit from implementing at least one remediation recommendation is expressed in client incident hours.

8. The method of claim 1, wherein the list of remediation recommendations is sorted based on actionability, wherein actionability is defined as how quickly a particular remediation may be applied.

9. The method of claim 1 further comprising:
generating a network incident graph to identify localized areas associated with the network incidents; and
providing the generated graph for display.

10. The method of claim 1 further comprising:
receiving selection of a remediation recommendation from the list of remediation recommendations; and
implementing the selected remediation recommendation from the list of remediation recommendations.

11. A non-transitory machine readable medium comprising a program that when executed by at least one processing unit identifies network incidents and provides remediation recommendations for the network incidents, the program comprising sets of instructions for:
analyzing a stream of network data that is captured over a time period, in order to identify a plurality of incidents within the network over the time period, each network incident relating to an issue and having a set of symptoms that is associated with a set of possible root-causes; and
identifying a plurality of groups of network incidents with the network incidents in each group related to the same issue; and
analyzing the grouped network incidents to identify, and to provide a display of, a list of remediation recommendations that includes a remediation recommendation for each group of incidents, each group's remediation recommendation identifying a remediation to resolve the issue related to the group and a quantified expected benefit from implementing the remediation.

12. The non-transitory machine readable medium of claim 11, wherein each group's remediation recommendation further identifies at least one root cause for the network incidents in the group.

13. The non-transitory machine readable medium of claim 11, wherein the set of instructions for identifying the plurality of groups comprises a set of instructions for grouping the network incidents that relate to the same issue.

14. The non-transitory machine readable medium of claim 11, wherein network incidents are associated with client incident hours, the program further comprises a set of instructions for computing for each group an aggregate client incident hour based on the client incident hours of each network incident in the group, wherein the set of instructions for analyzing the grouped network incidents comprises a set of instructions for generating a sorted order of the groups based on the aggregate client incident hours of the groups.

15. The non-transitory machine readable medium of claim 14, wherein:
the set of instructions for generating the sorted order comprises a set of instructions for generating a sorted order that lists the groups from highest to lowest aggregated incident hours; and
the set of instructions for providing the display of the list of remediation recommendations comprises a set of instructions for providing a display of a subset of N groups of network incidents that have the highest aggregate incident hours, N being an integer.

16. The non-transitory machine readable medium of claim 11, wherein a network incident is a client, infrastructure, or application incident that negatively affects a subset of elements in the network.

17. The non-transitory machine readable medium of claim 11, wherein the quantified expected benefit from implementing at least one remediation recommendation is expressed in client incident hours.

18. The non-transitory machine readable medium of claim 11, wherein the list of remediation recommendations is sorted based on actionability, wherein actionability is defined as how quickly a particular remediation may be applied.

19. The non-transitory machine readable medium of claim 11, wherein the program further comprises a set of instructions for:
generating a network incident graph to identify localized areas associated with the network incidents; and
providing the generated graph for display.

20. The non-transitory machine readable medium of claim 11, wherein the program further comprises a set of instructions for:
receiving selection of a remediation recommendation from the list of remediation recommendations; and
implementing the selected remediation recommendation from the list of remediation recommendations.

* * * * *